United States Patent
Yu et al.

(10) Patent No.: US 10,757,245 B2
(45) Date of Patent: Aug. 25, 2020

(54) MESSAGE DISPLAY METHOD, USER TERMINAL, AND GRAPHICAL USER INTERFACE

(71) Applicant: Huawei Technologies Co., Ltd., Shenzhen (CN)

(72) Inventors: Xiaobo Yu, Shenzhen (CN); Yajun Zhang, Shenzhen (CN); Shuiping Long, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/321,146

(22) PCT Filed: Aug. 9, 2016

(86) PCT No.: PCT/CN2016/094167
§ 371 (c)(1),
(2) Date: Mar. 13, 2019

(87) PCT Pub. No.: WO2018/027551
PCT Pub. Date: Feb. 15, 2018

(65) Prior Publication Data
US 2019/0356770 A1  Nov. 21, 2019

(51) Int. Cl.
*H04M 1/00* (2006.01)
*H04M 1/725* (2006.01)
(Continued)

(52) U.S. Cl.
CPC ...... *H04M 1/72552* (2013.01); *G06F 3/0482* (2013.01); *H04L 51/14* (2013.01); *H04W 4/12* (2013.01)

(58) Field of Classification Search
CPC .. H04M 1/72552; G06F 3/0482; H04L 51/14; H04W 4/12
See application file for complete search history.

(56) References Cited

U.S. PATENT DOCUMENTS

2002/0130904 A1* 9/2002 Becker ............... G06F 3/0481
                                                   715/753
2004/0248598 A1* 12/2004 Ding ................. H04M 1/72552
                                                   455/466
(Continued)

FOREIGN PATENT DOCUMENTS

CN    102576251 A    7/2012
CN    102970210 A    3/2013
(Continued)

OTHER PUBLICATIONS

Machine Translation and Abstract of Chinese Publication No. CN102970210, dated Mar. 13, 2013, 12 pages.
(Continued)

*Primary Examiner* — Khai M Nguyen
(74) *Attorney, Agent, or Firm* — Conley Rose, P.C.

(57) ABSTRACT

A message display method, a user terminal, and a graphical user interface, where the method includes: detecting, by a user terminal, a press parameter when a user performs a press operation on the user terminal, and displaying the unread dedicated message when the first press parameter is greater than a first preset parameter and an unread dedicated message of the user exists in a group of a communicate application. Hence, the user only needs to press the user terminal, and when a press condition is met, the user terminal can automatically display the unread dedicated message of the user. Therefore, it is more convenient to view a dedicated message.

20 Claims, 30 Drawing Sheets

(51) Int. Cl.
*G06F 3/0482* (2013.01)
*H04L 12/58* (2006.01)
*H04W 4/12* (2009.01)

(56) References Cited

U.S. PATENT DOCUMENTS

| | | | |
|---|---|---|---|
| 2014/0075375 A1* | 3/2014 | Hwang | G06F 3/0485 |
| | | | 715/784 |
| 2015/0026590 A1* | 1/2015 | Shirzadi | G06F 3/017 |
| | | | 715/751 |
| 2015/0169208 A1 | 6/2015 | Cho et al. | |
| 2015/0302103 A1 | 10/2015 | Jeremias | |
| 2015/0341291 A1 | 11/2015 | Rideout et al. | |
| 2017/0111308 A1* | 4/2017 | Kim | H04L 51/34 |
| 2017/0187653 A1* | 6/2017 | Saito | H04L 51/04 |
| 2018/0159809 A1* | 6/2018 | Xie | G06F 3/0488 |

FOREIGN PATENT DOCUMENTS

| | | | | |
|---|---|---|---|---|
| CN | 102982435 A | | 3/2013 | |
| CN | 104994003 A | | 10/2015 | |
| CN | 105302458 A | * | 2/2016 | ........... G06F 3/0488 |
| CN | 105373286 A | * | 3/2016 | |
| CN | 105373286 A | | 3/2016 | |
| CN | 105376141 A | | 3/2016 | |
| CN | 105391562 A | | 3/2016 | |
| CN | 105446602 A | | 3/2016 | |
| CN | 105553826 A | | 5/2016 | |
| CN | 105554710 A | | 5/2016 | |
| CN | 105554710 A | * | 5/2016 | |
| CN | 105824497 A | * | 8/2016 | |
| WO | 2011028944 A1 | | 3/2011 | |

OTHER PUBLICATIONS

Machine Translation and Abstract of Chinese Publication No. CN105373286, dated Mar. 2, 2016, 19 pages.
Machine Translation and Abstract of Chinese Publication No. CN105376141, dated Mar. 2, 2016, 23 pages.
Machine Translation and Abstract of Chinese Publication No. CN105553826, dated May 4, 2016, 25 pages.
Machine Translation and Abstract of Chinese Publication No. CN105554710, dated May 4, 2016, 32 pages.
Foreign Communication From a Counterpart Application, PCT Application No. PCT/CN2016/094167, English Translation of International Search Report dated May 4, 2017, 2 pages.
Foreign Communication From a Counterpart Application, PCT Application No. PCT/CN2016/094167, English Translation of Written Opinion dated May 4, 2017, 4 pages.
Machine Translation and Abstract of Chinese Publication No. CN102982435, dated Mar. 20, 2013, 18 pages.
Machine Translation and Abstract of Chinese Publication No. CN104994003, dated Oct. 21, 2015, 29 pages.
Foreign Communication From a Counterpart Application, Chinese Application No. 201680049514.3, Chinese Office Action dated Aug. 27, 2019, 12 pages.

* cited by examiner

A user terminal detects a press parameter that is entered when a user performs a press operation on the user terminal If the press parameter is greater than a preset parameter, and an unread dedicated message of the user exists in a group of a communication application on the user terminal, the user terminal outputs the unread dedicated message

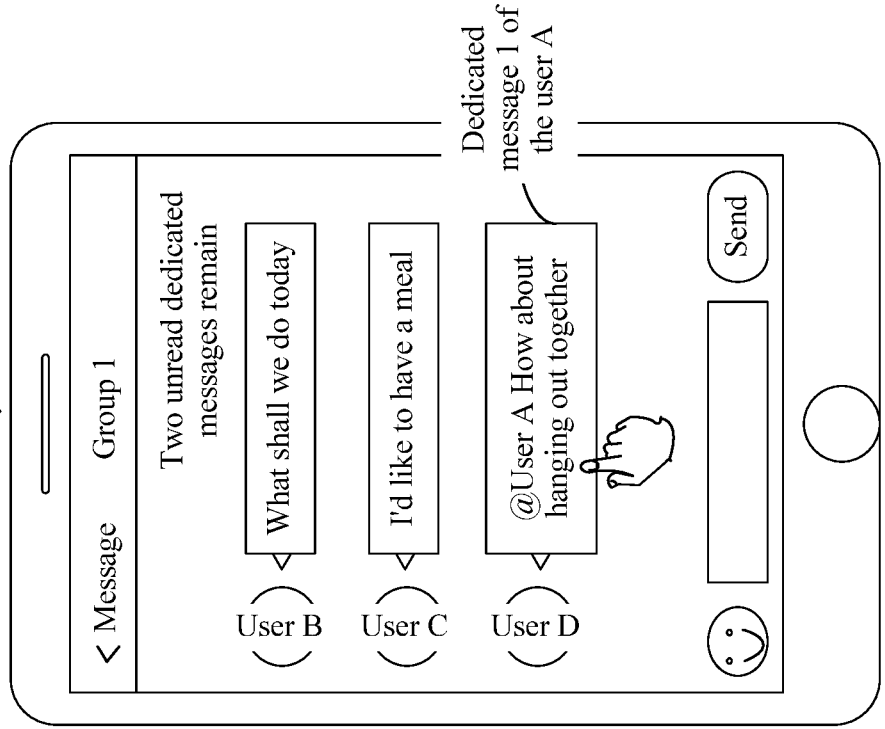
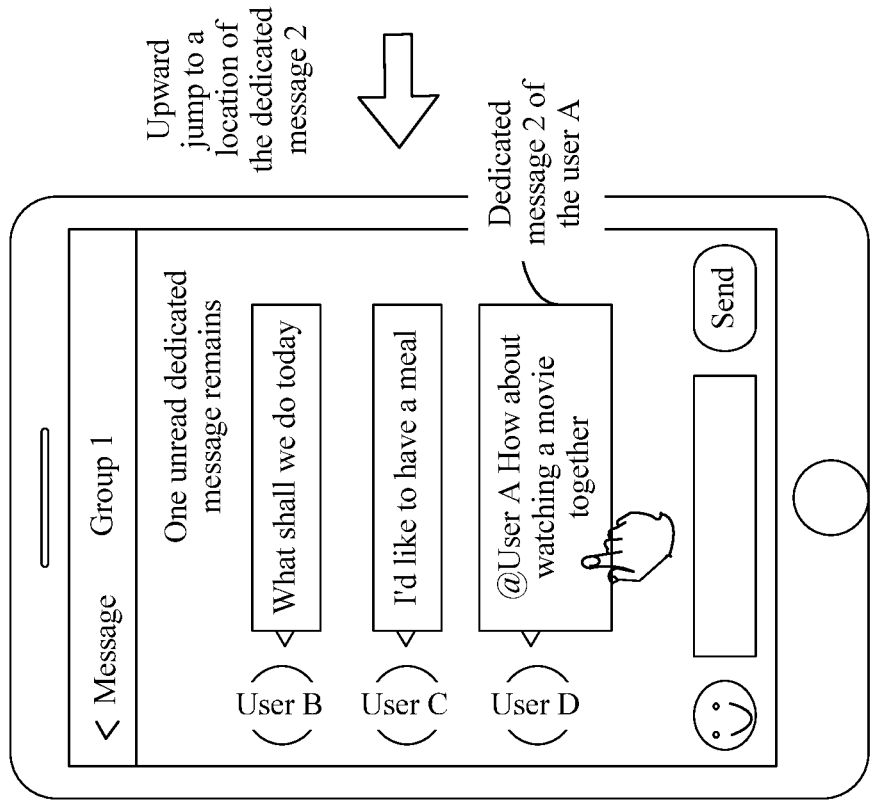
FIG. 17B
FIG. 17C

MESSAGE DISPLAY METHOD, USER TERMINAL, AND GRAPHICAL USER INTERFACE

This application is a U.S. National Stage of International Patent Application No. PCT/CN2016/094167 filed on Aug. 9, 2016, which is hereby incorporated by reference in its entirety.

TECHNICAL FIELD

The present invention relates to the field of terminal technologies, and in particular, to a message display method, a user terminal, and a graphical user interface.

BACKGROUND

Currently, many communication applications (such as WeChat and QQ) emerge to facilitate daily communication between users. A user may usually create a group in the communication application for chatting among a plurality of people. The group includes a plurality of member users. Any member user can post a message on a message display screen of the group. After the message is successfully posted, all member users in the group can view the message on the message display screen, so that a plurality of people can chat with each other.

When a user A in the group intends to notify only a user B of a message, the user A may post a dedicated message of the user B on the message display screen of the group. For example, in many applications, as shown in FIG. 1, if the user A intends to ask only the user B to read a book, the user A may post a message "@User B How about reading a book" on a message display screen of a group 1. The message "@User B How about reading a book" is the dedicated message of the user B.

However, it is found in practice that a group usually includes many users, and many users post messages on a message display screen of the group, and therefore, many messages are displayed on the message display screen of the group. When many unread messages of a user exist in the group and the unread messages include a dedicated message of the user, the user needs to open the message display screen of the group and constantly perform upward sliding to search the unread messages for the unread dedicated message of the user. It can be learned that it is not convenient enough to view the dedicated message in this manner.

SUMMARY

Embodiments of the present invention disclose a message display method, a user terminal, and a graphical user interface, so that it is more convenient to view a dedicated message.

A first aspect provides a message display method, and the method is applied to a user terminal on which a communication application is installed. The method includes: detecting, by the user terminal, a first press parameter that is entered when a user performs a press operation on the user terminal; and if the first press parameter is greater than a first preset parameter and an unread dedicated message of the user exists in a group of the communication application, displaying, by the user terminal, the unread dedicated message.

It can be learned that, according to the method provided in the first aspect, when an unread dedicated message of the user exists in the group of the communication application, the user does not need to open a message display screen of the group and then perform upward sliding to locate the unread dedicated message. The user only needs to press the user terminal, and if a press condition is met, the user terminal can automatically display the unread dedicated message of the user. Therefore, it is more convenient to view a dedicated message.

In a possible implementation, the first press parameter may be press force or press duration. Correspondingly, when the first press parameter is press force, the first preset parameter may be preset force; when the first press parameter is press duration, the first preset parameter is preset duration.

In a possible implementation, the first press parameter may be a press fingerprint. If the first press parameter is a press fingerprint, after the user terminal verifies that the press fingerprint matches a preset fingerprint and an unread dedicated message of the user exists in the group of the communication application on the user terminal, the user terminal displays the unread dedicated message.

In a possible implementation, the user terminal may specifically detect a first press parameter that is entered when the user performs a press operation on a physical button of the user terminal.

According to this implementation, the user performs a press operation on the physical button of the user terminal, and the user terminal may directly display the unread dedicated message if the press operation meets a preset condition. It can be learned that according to this implementation, the unread dedicated message can be displayed more quickly, so that the user can view the unread dedicated message more conveniently.

In a possible implementation, the user terminal may specifically detect a first press parameter that is entered when the user performs a press operation on a screen of the user terminal.

According to this implementation, the user performs a press operation on the display screen of the user terminal, and the user terminal may directly display the unread dedicated message if the press operation meets a preset condition. It can be learned that according to this implementation, the unread dedicated message can be displayed more quickly, so that the user can view the unread dedicated message more conveniently.

In a possible implementation, the user terminal may specifically detect a first press parameter that is entered when the user performs a press operation on an application icon of the communication application.

According to this implementation, on a menu screen, the user does not need to tap the icon of the communication application to start the communication application, and then open the message display screen of the group to manually view the unread dedicated message. Instead, after pressing the icon of the communication application by the user meets a preset condition, the user terminal may directly display the unread dedicated message. Therefore, the unread dedicated message can be displayed more quickly, so that the user can view the unread dedicated message more conveniently.

In a possible implementation, the user terminal may specifically detect a first press parameter that is entered when the user performs a press operation on a screen of the communication application.

According to this implementation, the user does not need to manually search many messages for the unread dedicated message. On the display screen of the communication application, the user terminal may directly display the unread dedicated message after pressing the display screen of the communication application by the user meets a preset condition. Therefore, the user can view the unread dedicated message more conveniently.

In a possible implementation, the user terminal may specifically detect a first press parameter that is entered when the user performs a press operation on a group option on a screen of the communication application.

According to this implementation, after the user terminal detects that the press parameter that is entered when the user performs a press operation on the group option of the communication application meets a preset condition, the user terminal may display an unread dedicated message included in the pressed group option. Therefore, according to this implementation, the user can flexibly select an unread dedicated message in a group as required.

In a possible implementation, the user terminal may specifically detect a first press parameter that is entered when the user performs a press operation on a message display screen corresponding to the group of the communication application.

In an actual application, many communication applications provide a user with a prompt of an unread dedicated message on a message display screen of a group. Therefore, according to this implementation, when finding that an unread dedicated message exists on the message display screen of the group, the user may directly press the message display screen of the group to view the unread dedicated message. Therefore, the unread dedicated message can be quickly and conveniently viewed.

In a possible implementation, a specific implementation of displaying the unread dedicated message by the user terminal may be as follows: The user terminal jumps to a location of the unread dedicated message on the message display screen of the group to display the unread dedicated message.

An unread dedicated message is displayed by using the message display screen of the group, so that the user can view content of a previous message and a next message.

In a possible implementation, a specific implementation of displaying the unread dedicated message by the user terminal may be as follows: The user terminal outputs a dedicated message display screen for displaying an unread dedicated message. The dedicated message display screen does not belong to the message display screen of the group, that is, the user terminal separately generates the dedicated message display screen to display the unread dedicated message.

In this way, the user terminal does not need to display the message display screen corresponding to the group, and then jump to the location of the unread dedicated message. Therefore, the unread dedicated message can be presented to the user more quickly.

In a possible implementation, when detecting that a plurality of unread dedicated messages of the user exist in the group of the communication application, the user terminal displays all the unread dedicated messages by using the foregoing dedicated message display screen. In this way, all the unread dedicated messages can be presented to the user more quickly.

In a possible implementation, after detecting that the first press parameter is greater than the first preset parameter and a plurality of unread dedicated messages of the user exist in the group of the communication application, the user terminal may sort the unread dedicated messages based on a sequence of posting times of the unread dedicated messages, and display an unread dedicated message with an earliest or latest posting time. Optionally, the user terminal may display the unread dedicated message with the earliest or latest posting time by using the message display screen of the group. For example, the user terminal may jump to a location of the unread dedicated message with the earliest or latest posting time on the message display screen of the group. Optionally, the user terminal may display the unread dedicated message with the earliest or latest posting time by using the dedicated message display screen described above.

When there are a plurality of unread dedicated messages in the group, the user usually wants to view a latest unread dedicated message or an earliest unread dedicated message. According to this implementation, the user terminal can directly output the latest or the earliest unread dedicated message for the user to view.

In a possible implementation, after detecting that the first press parameter is greater than the first preset parameter and a plurality of unread dedicated messages of the user exist in the group of the communication application, the user terminal may display a selection list that includes message options. The message options in the selection list are in a one-to-one correspondence with the unread dedicated messages. The user may select a message option, and the user terminal displays an unread dedicated message corresponding to the message option selected by the user. Optionally, the user terminal may display, by using the message display screen of the group, the unread dedicated message corresponding to the message option selected by the user. For example, the user terminal may jump, on the message display screen of the group, to a location of the unread dedicated message corresponding to the message option selected by the user. Alternatively, the user terminal may display, by using the dedicated message display screen described above, the unread dedicated message corresponding to the message option selected by the user.

According to this implementation, when there are a plurality of unread dedicated messages in the group, the user may select an unread dedicated message as required. Therefore, it is more flexible to view an unread dedicated message.

In a possible implementation, the user terminal may sort and display the message options based on a sequence of posting times of the dedicated messages corresponding to the message options. The message options are sorted and displayed based on the sequence of the posting times of the dedicated messages, so that the user can quickly select a message option.

In a possible implementation, the user terminal may sort and display the message options based on priorities of senders of the dedicated messages. The message options are sorted and displayed based on the priorities of the senders of the dedicated messages, so that the user can quickly select a message option.

In a possible implementation, the user terminal may sort and display the message options based on priorities of keywords in the unread dedicated messages. The message options are sorted and displayed based on the priorities of the keywords in the unread dedicated messages, so that the user can quickly select a message option.

In a possible implementation, after detecting that the first press parameter is greater than the first preset parameter and a plurality of unread dedicated messages of the user exist in the group of the communication application, the user terminal may group the unread dedicated messages into corresponding time periods based on posting times of the unread dedicated messages, to classify the unread dedicated messages. After the user terminal classifies the unread dedicated messages, if the unread dedicated messages are grouped into a plurality of time periods, the user terminal outputs a selection list that includes options of the plurality of time periods. The user may select a time period from the selection list, and the user terminal displays an unread dedicated message included in the time period. Optionally, the user terminal may display, by using the message display screen of the group, the unread dedicated message included in the time period. For example, the user terminal may jump, on the message display screen of the group, to a location of the unread dedicated message included in the time period. Alternatively, the user terminal may display, by using the dedicated message display screen described above, the unread dedicated message included in the time period.

When there are many unread dedicated messages, the unread dedicated messages are grouped into corresponding time periods based on posting times of the unread dedicated messages. The user may select, from a selection list that outputs options that include the plurality of time periods, a time period in which the user is interested, so as to view an unread dedicated message posted in the time period. Therefore, according to this implementation, the user can find an unread dedicated message more quickly as required.

In a possible implementation, after the user terminal displays the unread dedicated message by using the message display screen of the group, the user terminal may detect a second press parameter that is entered when the user performs a press operation on the message display screen of the group. If the second press parameter is greater than a second preset parameter, the user terminal jumps to a location of a next unread dedicated message on the message display screen of the group, so that the user can view the another unread dedicated message. Optionally, the second press parameter may be press force or press duration. Correspondingly, the second preset parameter may be preset force or preset duration.

According to this implementation, a press operation is performed on the message display screen of the group, so that other unread dedicated messages in the group can be conveniently viewed.

In a possible implementation, after the user terminal displays the unread dedicated message by using the message display screen of the group, a specific implementation in which the user terminal detects the second press parameter that is entered when the user performs a press operation on the message display screen of the group may be as follows: The user terminal detects a second press parameter that is entered when the user performs a press operation on a displayed dedicated message.

According to this implementation, a press operation is performed on a dedicated message on the message display screen of the group, so that other unread dedicated messages in the group can be conveniently viewed.

In a possible implementation, after displaying the unread dedicated message by using the message display screen of the group, the user terminal detects whether another unread dedicated message of the user exists. If another unread dedicated message of the user is detected, the user terminal may provide the user with a prompt of a quantity of unread dedicated messages on the message display screen, so that the user determines whether to continue to press the message display screen or a dedicated message displayed on the message display screen, so as to view another unread dedicated message.

In a possible implementation, after the user terminal displays the unread dedicated message on the message display screen of the group, the user terminal displays a jump arrow on the message display screen of the group. The jump arrow includes at least one of an upward jump arrow or a downward jump arrow. The user terminal jumps to a location of a previous unread dedicated message on the message display screen of the group when detecting a press operation performed by the user on the upward jump arrow. The previous unread dedicated message may be an unread dedicated message posted before a currently displayed message. The user terminal jumps to a location of a next unread dedicated message on the message display screen of the group when detecting a press operation performed by the user on the downward jump arrow. The next unread dedicated message may be an unread dedicated message posted after the currently displayed message.

According to this implementation, the user taps the upward jump arrow and the downward jump arrow on the message display screen of the group, so that other unread dedicated messages in the group can be conveniently viewed.

A second aspect provides a graphical user interface, and the graphical user interface is applied to a user terminal. The user terminal includes a display, a memory, and a processor for executing one or more programs stored in the memory. The graphical user interface is configured to: when a press parameter matches a preset parameter and an unread dedicated message of a user exists in a group of the communication application, display the unread dedicated message. The press parameter is a press parameter that is entered when the user performs a press operation on the user terminal.

According to the graphical user interface, when an unread dedicated message of the user exists in the group of the communication application, the user does not need to open a message display screen of the group and then perform upward sliding to locate the unread dedicated message. The user only needs to press the user terminal, and if a press condition is met, the graphical user interface can automatically display the unread dedicated message of the user. Therefore, it is more convenient to view a dedicated message.

A third aspect provides a user terminal, and the user terminal has a function of implementing a behavior of the user terminal in the first aspect or the possible implementations of the first aspect. The function may be implemented by using hardware, or may be implemented by implementing corresponding software by hardware. The hardware or the software includes one or more units corresponding to the foregoing function. The unit may be software and/or hardware.

A fourth aspect provides a user terminal, and the user terminal includes a display, one or more processors, a memory, and one or more programs. The one or more programs are stored in the memory, and are configured to be executed by the one or more processors. The one or more programs include an instruction. The instruction is used to perform the first aspect or the possible implementations of the first aspect.

According to a fifth aspect, an embodiment of the present invention provides a computer readable storage medium that stores one or more programs. The one or more programs include an instruction, and the instruction is used to perform the first aspect or the possible implementations of the first aspect.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 6 to FIG. 13A and FIG. 13B are schematic diagrams of a process of displaying an unread dedicated message according to an embodiment of the present invention;

FIG. 15A, FIG. 15B, and FIG. 15C to FIG. 18A, FIG. 18B, and FIG. 18C are schematic diagrams of a process of displaying an unread dedicated message according to an embodiment of the present invention.

DESCRIPTION OF EMBODIMENTS

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

The embodiments of the present invention provide a message display method, a user terminal, and a graphical user interface, so that it is more convenient to view a dedicated message.

The user terminal in the embodiments of the present invention may be a terminal such as a mobile phone, a wearable device (such as a smart watch or a smart band), a tablet computer, a personal computer (PC, Personal Computer), a PDA (Personal Digital Assistant, personal digital assistant), or an in-vehicle computer.

A communication application is installed on the user terminal in the embodiments of the present invention. The communication application is an application used for communication between users, for example, an instant messaging application (QQ, WeChat, Momo, YY, Fetion, or Line) or another social application. A group including a plurality of users may be created in the communication application and is used for communication among a plurality of people. For details of the group, refer to the background. A user in the group may send a dedicated message to another user. The dedicated message is a message to be viewed by a specific user. For details of the dedicated message, refer to the background. An unread dedicated message in the embodiments of the present invention is a dedicated message that has not been viewed by a user.

Figures 1, 2:
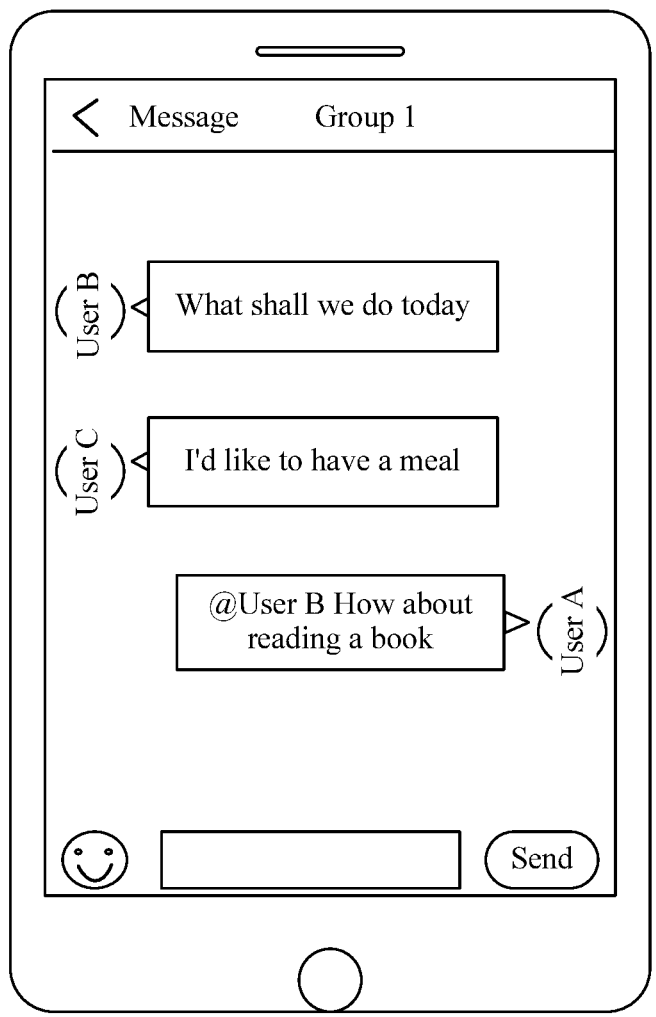
FIG. 1 is a schematic diagram of a message display screen of an existing group.
FIG. 2 is a schematic flowchart of a message display method according to an embodiment of the present invention.

A first embodiment of the present invention provides a message display method. Referring to FIG. 2, FIG. 2 is a schematic flowchart of a message display method according to an embodiment of the present invention. As shown in FIG. 2, a user terminal detects a press operation performed by a user on the user terminal, and detects a press parameter entered by using the press operation. If the press parameter is greater than a preset parameter and an unread dedicated message of the user exists in a group of a communication application on the user terminal, the user terminal displays the unread dedicated message.

It can be learned that, according to the method described in FIG. 2, when an unread dedicated message of the user exists in the group of the communication application, the user does not need to open a message display screen of the group and then perform upward sliding to locate the unread dedicated message. The user only needs to press the user terminal, and if a press condition is met, the user terminal can automatically display the unread dedicated message of the user. Therefore, it is more convenient to view a dedicated message.

In an optional implementation, the press parameter may be press force or press duration. Correspondingly, when the press parameter is press force, the preset parameter may be preset force; when the press parameter is press duration, the preset parameter is preset duration.

In an optional implementation, the press parameter may be a press fingerprint. If the press parameter is a press fingerprint, after the user terminal verifies that the press fingerprint matches a preset fingerprint and an unread dedicated message of the user exists in the group of the communication application on the user terminal, the user terminal displays the unread dedicated message.

In an optional implementation, the user terminal may specifically detect a press parameter that is entered when the user performs a press operation on a physical button of the user terminal. The physical button may be a home button, a volume up/down button, a power button, or the like.

According to this implementation, the user performs a press operation on the physical button of the user terminal, and the user terminal may directly display the unread dedicated message if the press operation meets a preset condition. It can be learned that according to this implementation, the unread dedicated message can be displayed more quickly, so that the user can view the unread dedicated message more conveniently.

In an optional implementation, the user terminal may specifically detect a press parameter that is entered when the user performs a press operation on a screen of the user terminal.

According to this implementation, the user performs a press operation on the screen of the user terminal, and the user terminal may directly display the unread dedicated message if the press operation meets a preset condition. It can be learned that according to this implementation, the unread dedicated message can be displayed more quickly, so that the user can view the unread dedicated message more conveniently.

Figure 3:
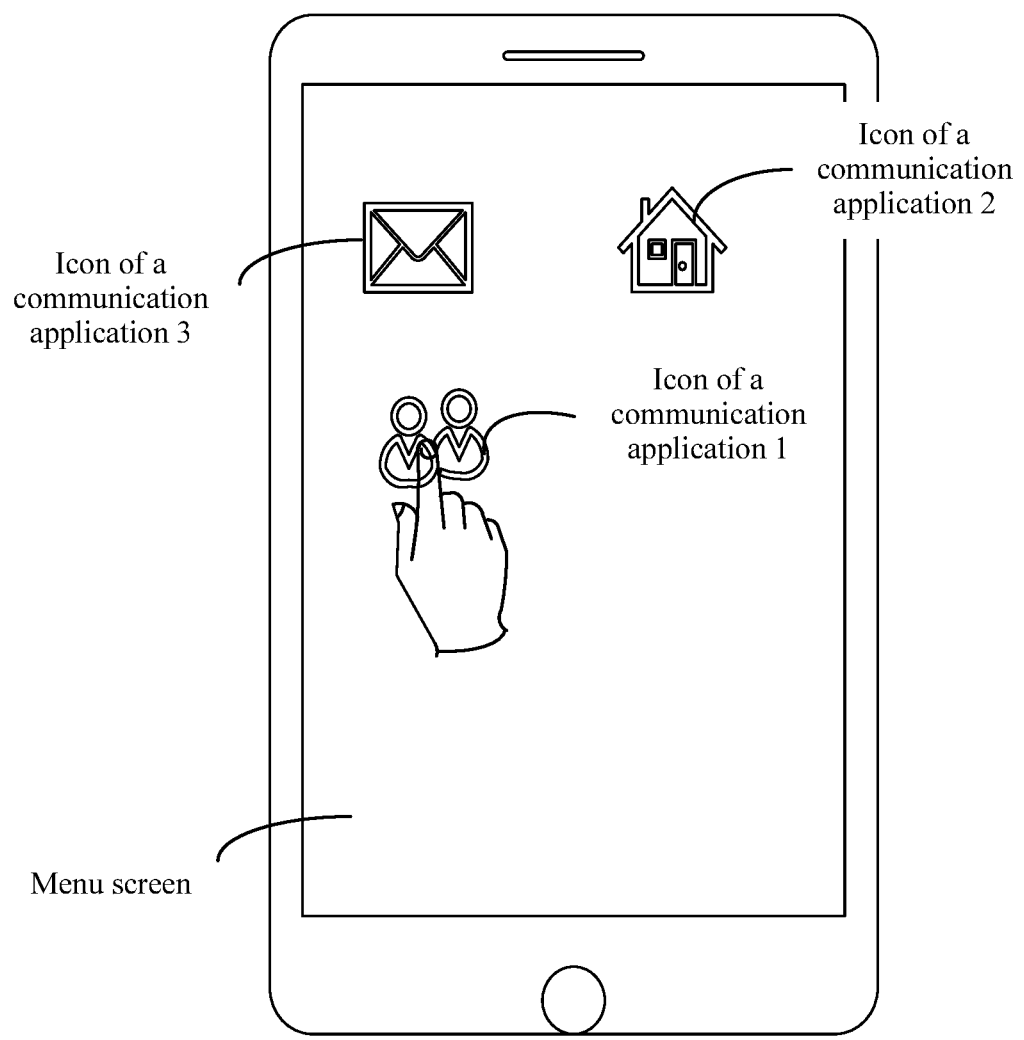
FIG. 3 is a schematic diagram of a menu screen according to an embodiment of the present invention.

In an optional implementation, the user terminal may specifically detect a press parameter that is entered when the user performs a press operation on an application icon of the communication application. As shown in FIG. 3, a menu screen of the user terminal includes an icon of a communication application 1. The user may press the icon of the communication application 1 on the menu screen of the user terminal. The user terminal detects a press parameter that is entered when the user performs a press operation on the icon of the communication application 1.

According to this implementation, on the menu screen, the user does not need to tap the icon of the communication application to start the communication application, and then open the message display screen of the group to manually view the unread dedicated message. Instead, after pressing the icon of the communication application by the user meets a preset condition, the user terminal may directly display the unread dedicated message. Therefore, the unread dedicated message can be displayed more quickly, so that the user can view the unread dedicated message more conveniently.

In an optional implementation, the user terminal may specifically detect a press parameter that is entered when the user performs a press operation on a screen of the communication application on the user terminal.

According to this implementation, the user does not need to manually search many messages for the unread dedicated message. On the screen of the communication application, the user terminal may directly display the unread dedicated message after pressing the screen of the communication application by the user meets a preset condition. Therefore, the user can view the unread dedicated message more conveniently.

In an optional implementation, the user terminal may specifically detect a press parameter that is entered when the user performs a press operation on a group option on a screen of the communication application.

Figure 4:
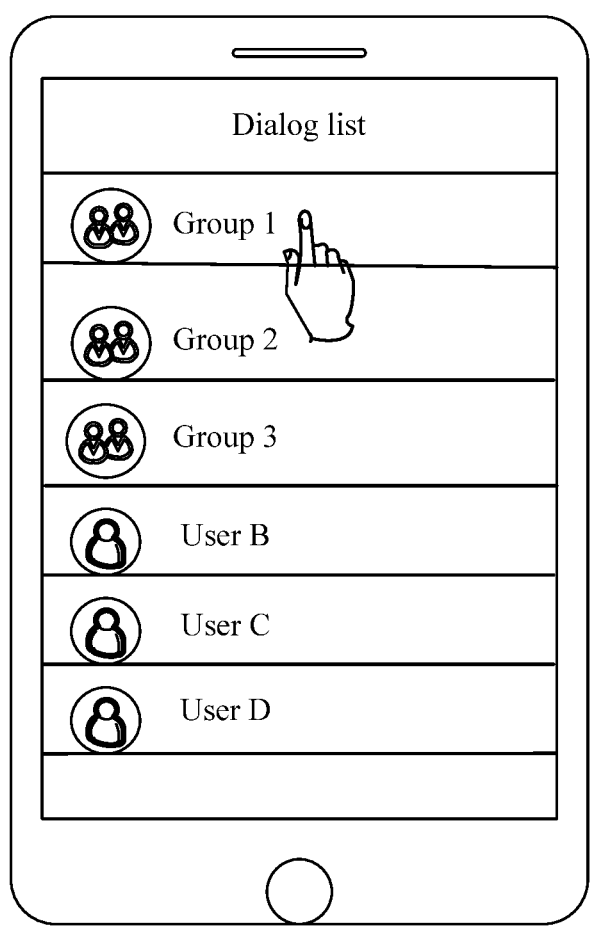
FIG. 4 is a schematic diagram of a screen of a communication application according to an embodiment of the present invention.

In this implementation, as shown in FIG. 4, the screen of the communication application includes group options: a group 1, a group 2, and a group 3. The user performs a press operation on a column of the group 1, a column of the group 2, or a column of the group 3, and the user terminal detects a press parameter that is entered when the user performs the press operation.

According to this implementation, when the user terminal detects that the press parameter that is entered when the user performs a press operation on the group option of the communication application meets a preset condition, the user terminal may display an unread dedicated message included in the pressed group option. Therefore, according to this implementation, the user can flexibly select an unread dedicated message in a group as required.

In an optional implementation, the user terminal may specifically detect a press parameter that is entered when the user performs a press operation on a message display screen corresponding to the group of the communication application.

Figure 5:
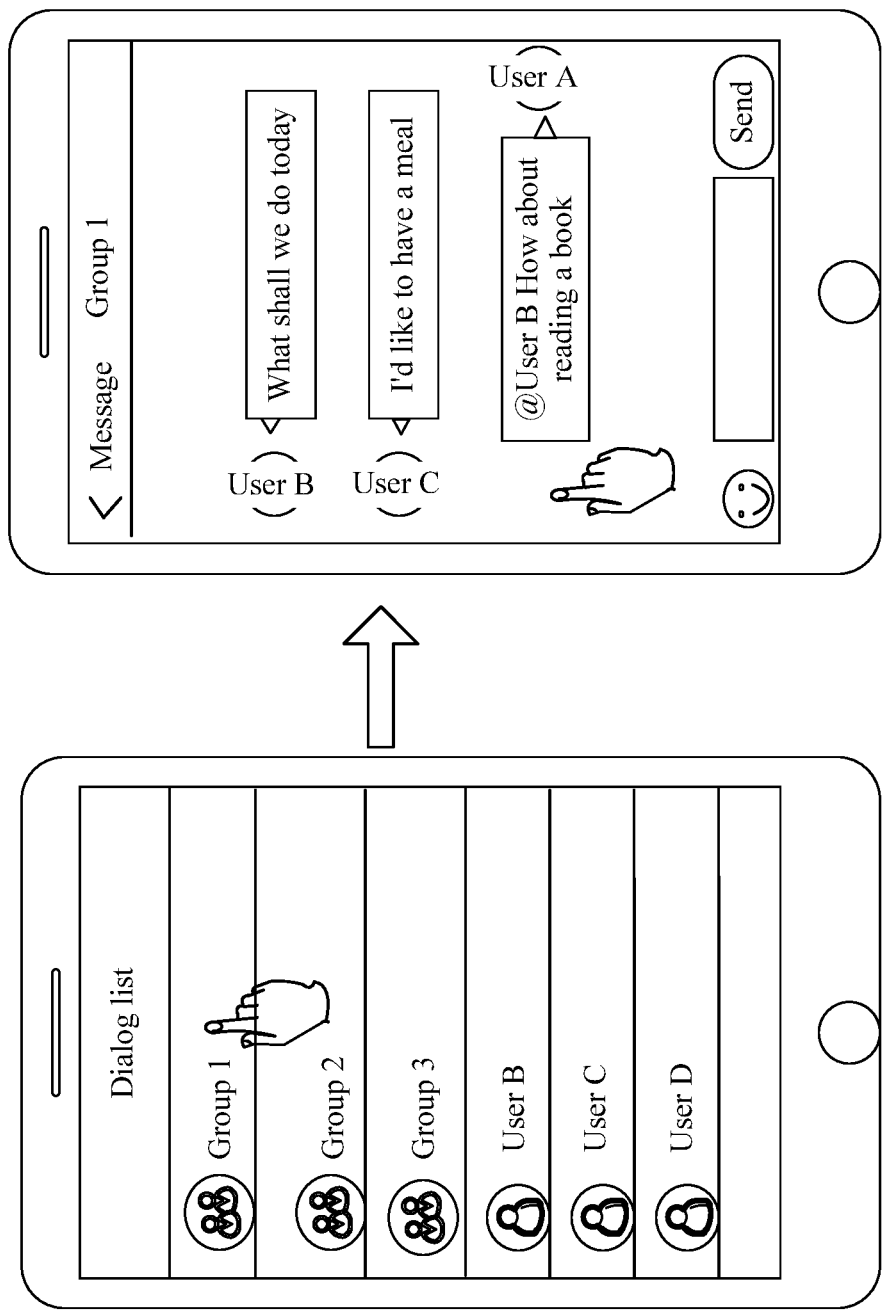
FIG. 5 is a schematic diagram of screen switching of a communication application according to an embodiment of the present invention.

In this implementation, the message display screen corresponding to the group is a screen used to display a message posted by a user in the group. For example, as shown in FIG. 5, on a display screen displaying group options, after the user taps a group 1, the user terminal may open a message display screen of the group 1, and a message sent by a user in the group 1 is displayed on the message display screen.

In an actual application, many communication applications provide a user with a prompt of an unread dedicated message on a message display screen of a group. Therefore, according to this implementation, when finding that an unread dedicated message exists on the message display screen of the group, the user may directly press the message display screen of the group to view the unread dedicated message. Therefore, the unread dedicated message can be quickly and conveniently viewed.

In an optional implementation, the user terminal may first detect a press parameter that is entered when the user performs a press operation on the user terminal, and after detecting that the press parameter matches the preset parameter, the user terminal detects whether an unread dedicated message of the user exists in the group of the communication application, and if an unread dedicated message of the user exists in the group of the communication application, displays the unread dedicated message. Alternatively, the user terminal may first detect whether an unread dedicated message of the user exists in the group of the communication application, and if an unread dedicated message of the user exists in the group of the communication application, detect a press parameter that is entered when the user performs a press operation on the user terminal, and display the unread dedicated message after detecting that the press parameter matches the preset parameter.

In an optional implementation, if the user terminal detects, on the message display screen of the group, a press parameter that is entered when the user performs a press operation on a physical button of the user terminal, the user terminal may search the group for an unread dedicated message of the user.

Figure 6:
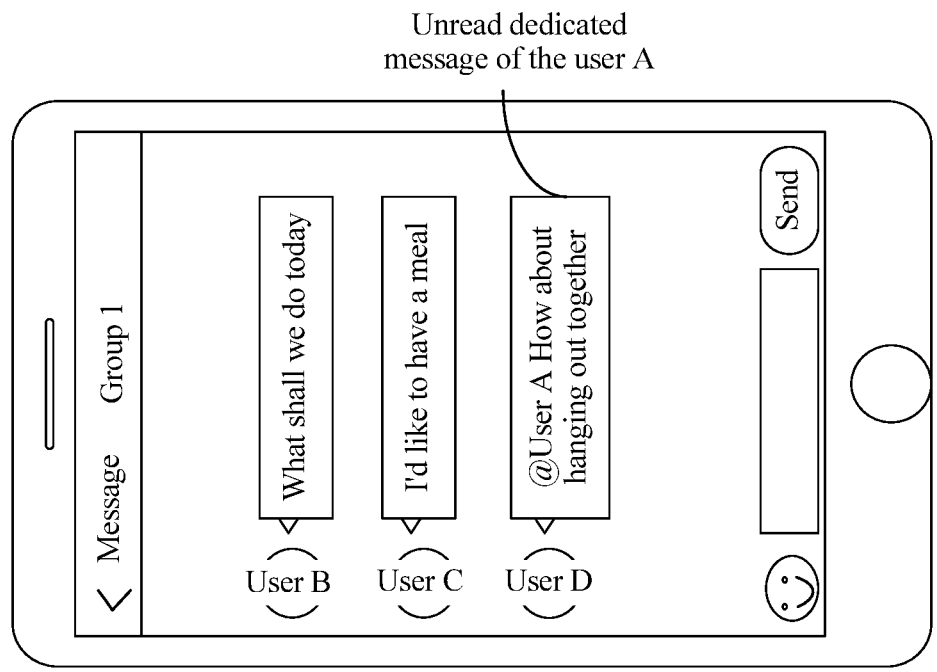
Figure 6:
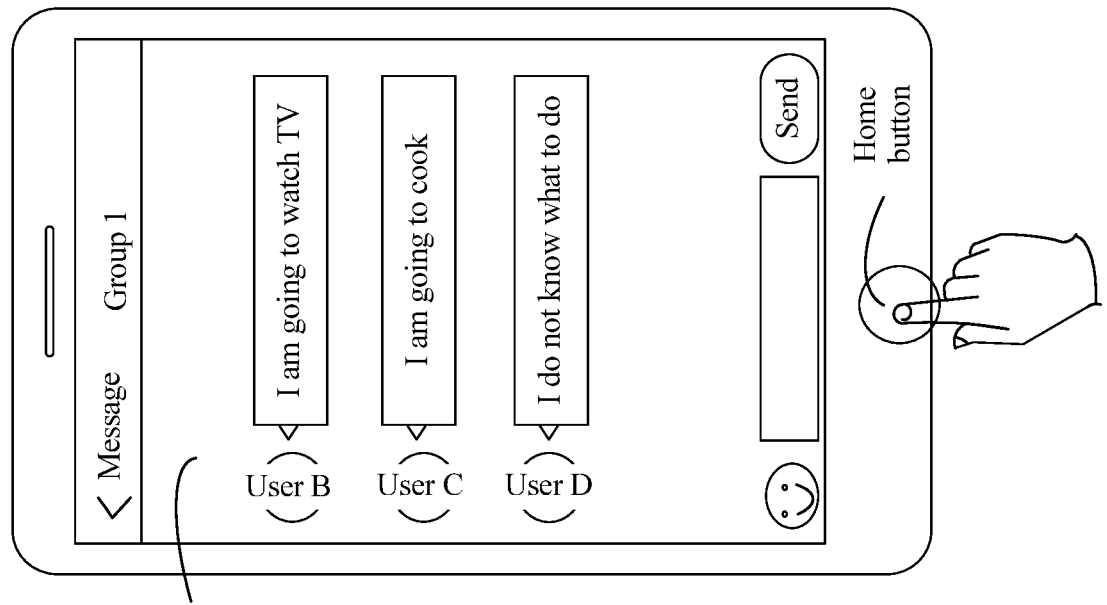

For example, as shown in FIG. 6, the user terminal displays a message display screen of a group 1 of a communication application 1, and a user A performs a press operation on a home button of the user terminal. After the user terminal detects that a press parameter of the press operation is greater than the preset parameter, the user terminal detects whether an unread dedicated message of the user A exists in the group 1 of the communication application 1. If an unread dedicated message of the user A exists in the group 1 of the communication application 1, the user terminal jumps to a location of the unread dedicated message of the user A on the message display screen of the group 1.

According to this implementation, when the user terminal displays the message display screen of the group of the communication application, the user performs a press operation on a physical button or a fingerprint input area to quickly view an unread dedicated message included in the group.

In an optional implementation, if the user terminal detects, on a screen different from the message display screen of the group, a press parameter that is entered when the user performs a press operation on a physical button of the user terminal, the user terminal may search all groups of the communication application for an unread dedicated message of the user.

According to this implementation, the user performs a press operation on a physical button or a fingerprint input area on a display screen different from the message display screen of the group of the communication application, to quickly view an unread dedicated message included in the group of the preset communication application.

In an optional implementation, if the user terminal detects a press parameter that is entered when the user performs a press operation on a screen of a non-communication application on the user terminal, the user terminal may search all groups of the communication application for an unread dedicated message of the user.

According to this implementation, the user performs a press operation on the screen of the non-communication application on the user terminal to quickly view an unread dedicated message included in the group.

In an optional implementation, if the user terminal detects a press parameter that is entered when the user performs a press operation on an icon of the communication application, the user terminal may search all groups of the communication application for an unread dedicated message of the user.

According to this implementation, the user performs a press operation on the icon of the communication application on a display screen of the user terminal to quickly view an unread dedicated message included in the group of the communication application.

In an optional implementation, if the user terminal detects a press parameter that is entered when the user performs a press operation on a screen of the communication application, the user terminal searches all groups of the communication application for an unread dedicated message of the user, or searches a group for an unread dedicated message of the user.

According to this implementation, the user performs a press operation on the display screen of the communication application to quickly view an unread dedicated message included in the group of the communication application.

In an optional implementation, if the user terminal detects a press parameter that is entered when the user performs a press operation on a group option, the user terminal may detect whether an unread dedicated message of the user exists in the pressed group option.

Figure 7:
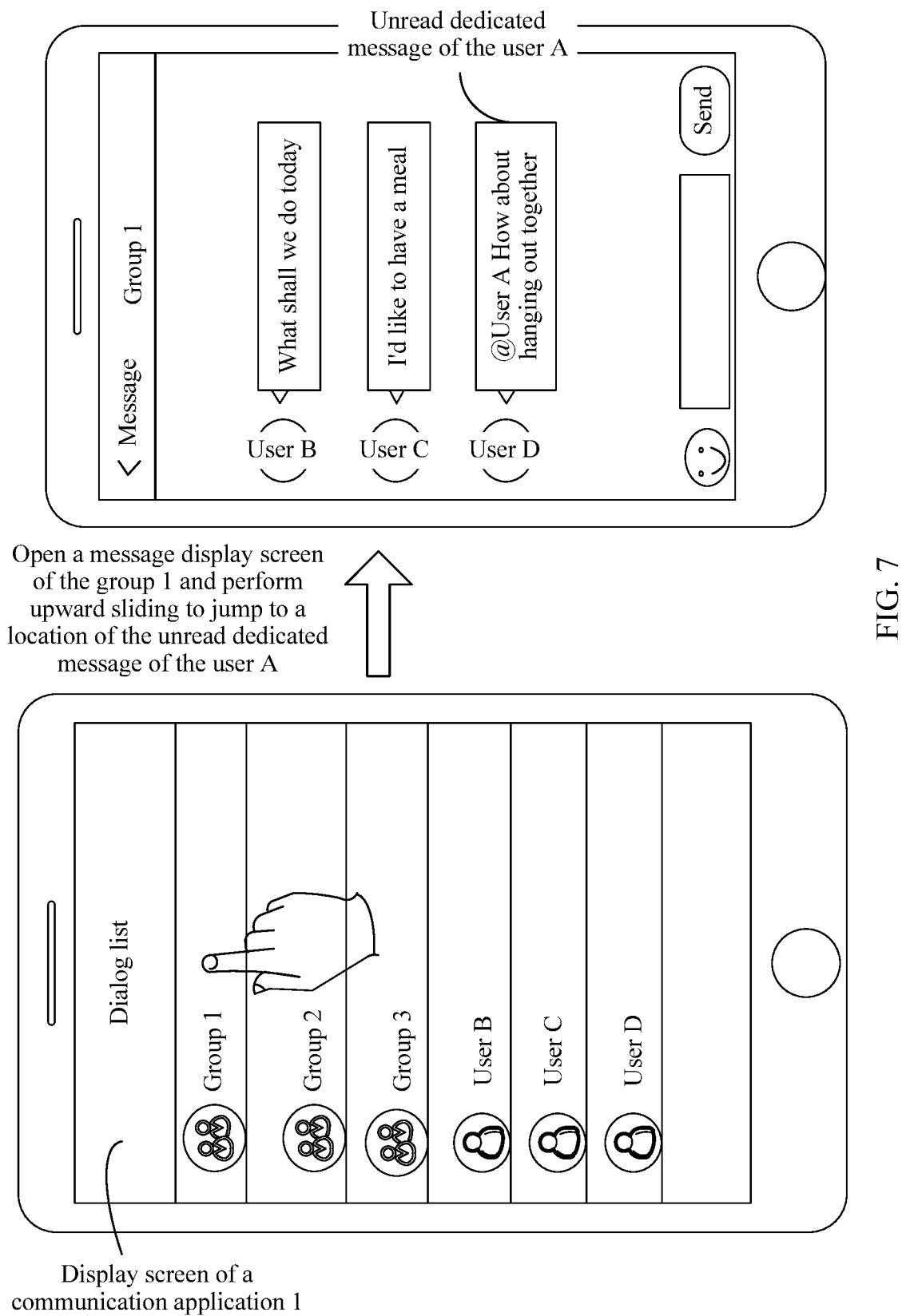

For example, as shown in FIG. 7, a user A performs a press operation on a column of a group 1 on a screen of a communication application. After the user terminal detects a press parameter of the press operation, if the press parameter is greater than the preset parameter, the user terminal may detect whether an unread dedicated message of the user exists in the group 1 of the communication application 1. If an unread dedicated message of the user exists in the group 1 of the communication application 1, the user terminal displays a message display screen of the group 1, and jumps to the unread dedicated message of the user A on the message display screen of the group 1.

According to this implementation, the user performs a press operation on the group option to quickly view an unread dedicated message included in a group of the communication application.

In an optional implementation, if the user terminal detects a press parameter that is entered when the user performs a press operation on the message display screen of the group, the user terminal may detect whether an unread dedicated message of the user exists in the group.

Figure 8:
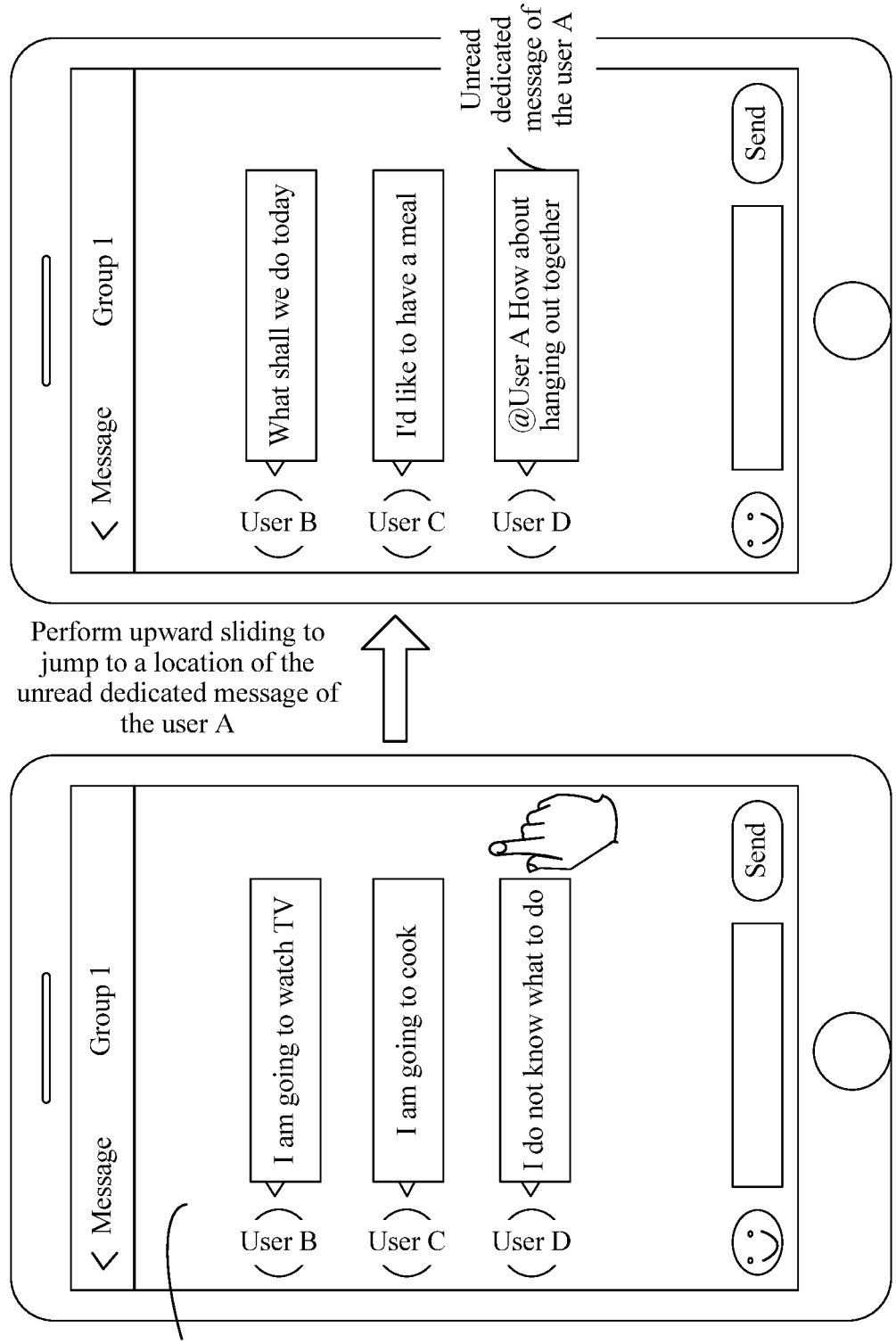

For example, as shown in FIG. 8, a user A performs a press operation on a message display screen of a group 1. After the user terminal detects that a press parameter of the press operation is greater than the preset parameter, the user terminal detects whether an unread dedicated message of the user exists in the group 1 of a communication application 1. If an unread dedicated message of the user exists in the group 1 of the communication application 1, the user terminal jumps to the unread dedicated message of the user A on the message display screen of the group 1.

According to this implementation, the user performs a press operation on the message display screen of the group to quickly view an unread dedicated message included in the group of the communication application.

In an optional implementation, a specific implementation of displaying the unread dedicated message by the user terminal may be as follows: The user terminal jumps to a location of the unread dedicated message on the message display screen of the group to display the unread dedicated message, that is, the user terminal displays the unread dedicated message by using the message display screen of the group, as shown in FIG. 6 to FIG. 8, for example.

An unread dedicated message is displayed by using the message display screen of the group, so that the user can view content of a previous message and a next message.

In an optional implementation, a specific implementation of displaying the unread dedicated message by the user terminal may be as follows: The user terminal outputs a dedicated message display screen for displaying an unread dedicated message. The dedicated message display screen does not belong to the message display screen of the group, that is, the user terminal separately generates the dedicated message display screen to display the unread dedicated message.

In this way, the user terminal does not need to display the message display screen corresponding to the group, and then jump to the location of the unread dedicated message. Therefore, the unread dedicated message can be presented to the user more quickly.

In this implementation, optionally, the user terminal may further display, on the dedicated message display screen, a name of a user who posts the unread dedicated message or a time for posting the unread dedicated message, so that the user can learn information about the unread dedicated message more comprehensively.

Figure 9:
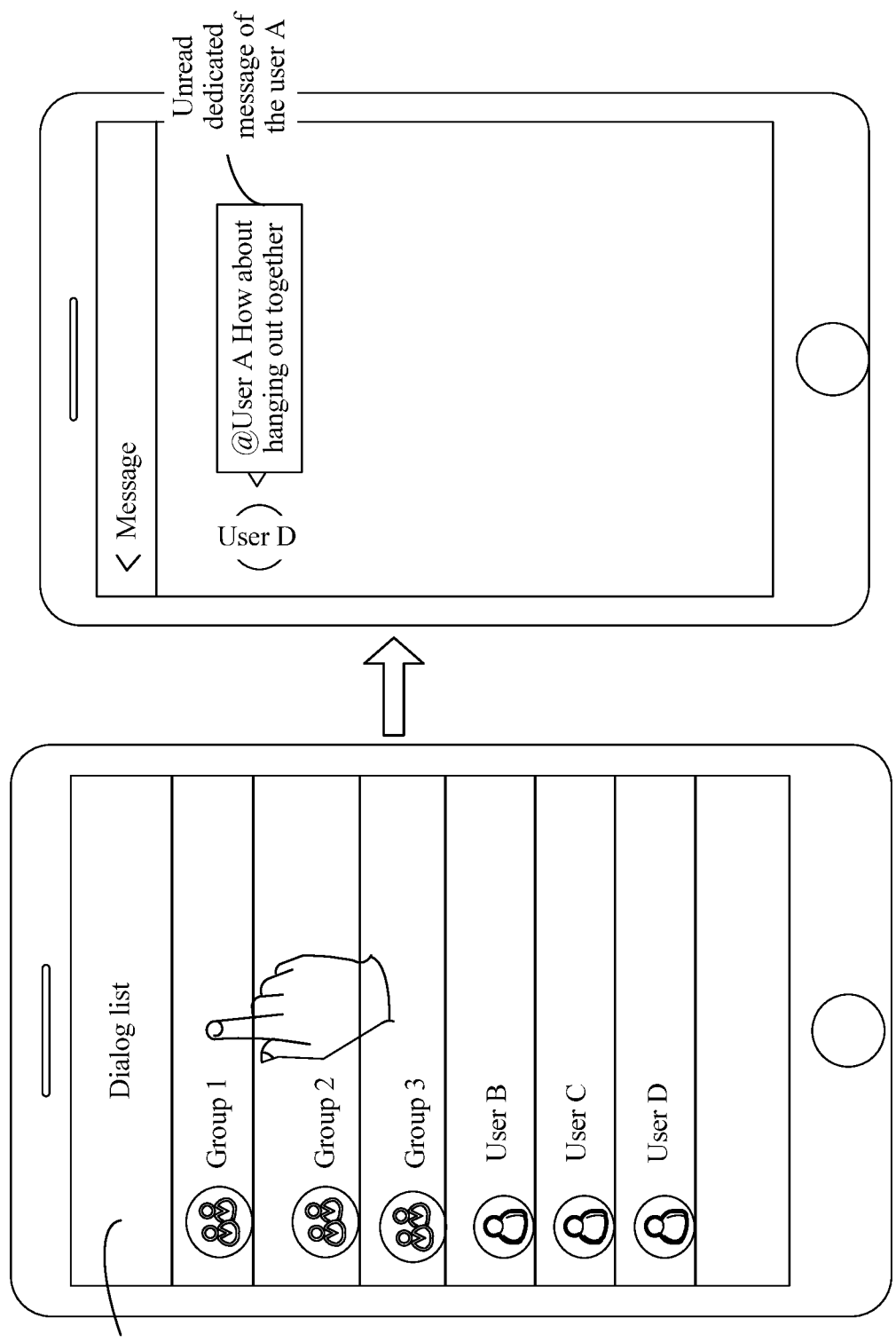

For example, as shown in FIG. 9, a user A performs a press operation on a column of a group 1 on a screen of a communication application 1. When the user terminal detects that a press parameter of the press operation is greater than the preset parameter, and an unread dedicated message of the user A exists in the group 1, the user terminal generates a dedicated message display screen to display the unread dedicated message of the user A. As shown in FIG. 9, the dedicated message display screen does not include another message in the group.

In an optional implementation, when detecting that a plurality of unread dedicated messages of the user exist in the group of the communication application, the user terminal displays all the unread dedicated messages by using the foregoing dedicated message display screen. In this way, all the unread dedicated messages can be presented to the user more quickly.

Figure 10A:
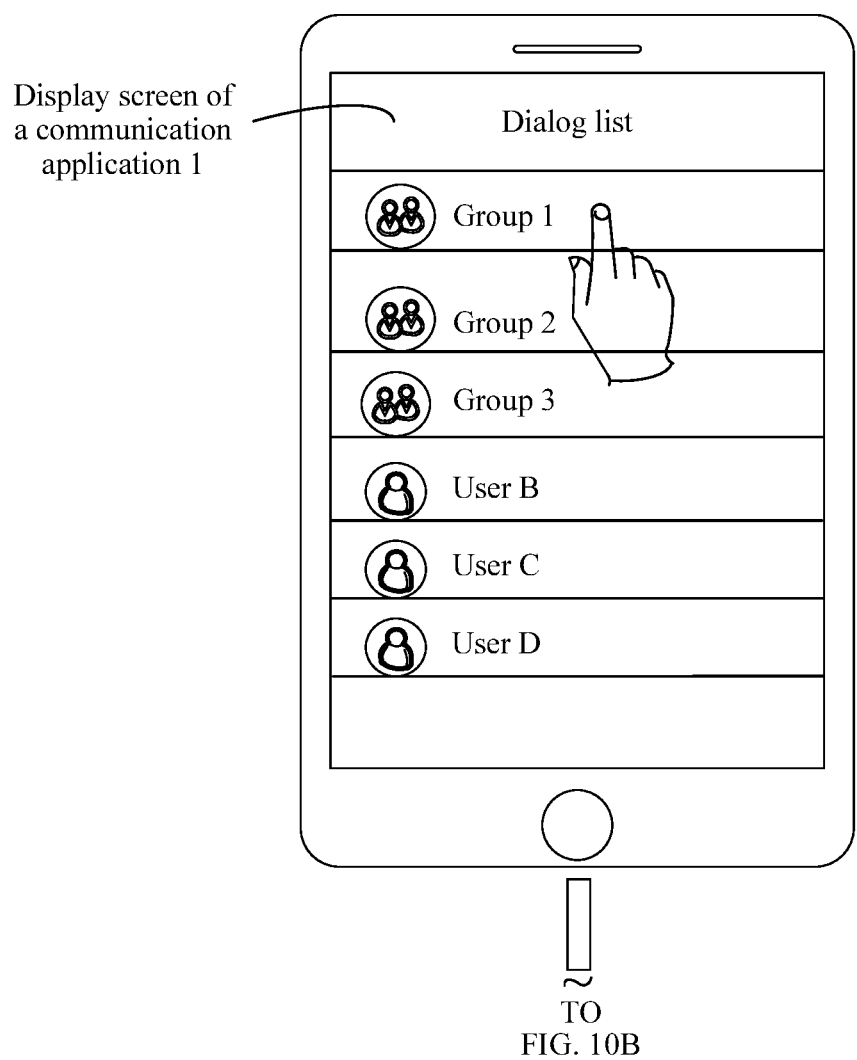
Figure 10B:
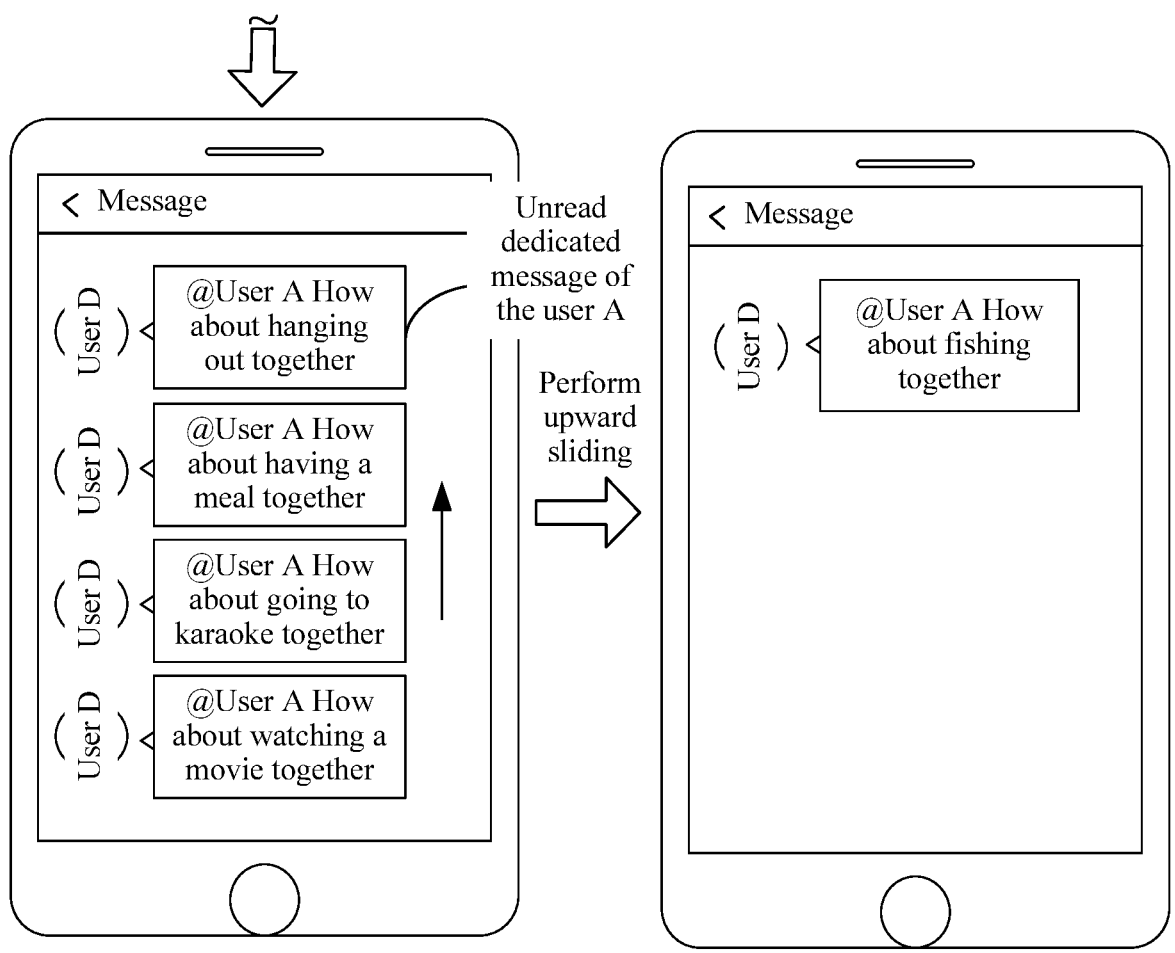

As shown in FIG. 10A and FIG. 10B, a user A performs a press operation on an option column of a group 1. When the user terminal detects that a press parameter of the press operation is greater than the preset parameter and five unread dedicated messages of the user A exist in the group 1, the user terminal outputs a dedicated message display screen that includes the five unread dedicated messages. As shown in FIG. 10A and FIG. 10B, the user may perform upward or downward sliding on the dedicated message display screen to view all the unread dedicated messages.

In an optional implementation, after the user terminal detects that the press parameter is greater than the preset parameter and a plurality of unread dedicated messages of the user exist in the group of the communication application, the user terminal may sort the unread dedicated messages based on a sequence of posting times of the unread dedicated messages, and display an unread dedicated message with an earliest or latest posting time in the plurality of unread dedicated messages. Optionally, the user terminal may display the unread dedicated message with the earliest or latest posting time in the plurality of unread dedicated messages by using the message display screen of the group, or the user terminal may display the unread dedicated message with the earliest or latest posting time in the plurality of unread dedicated messages by using the dedicated message display screen described above.

Figure 11A:
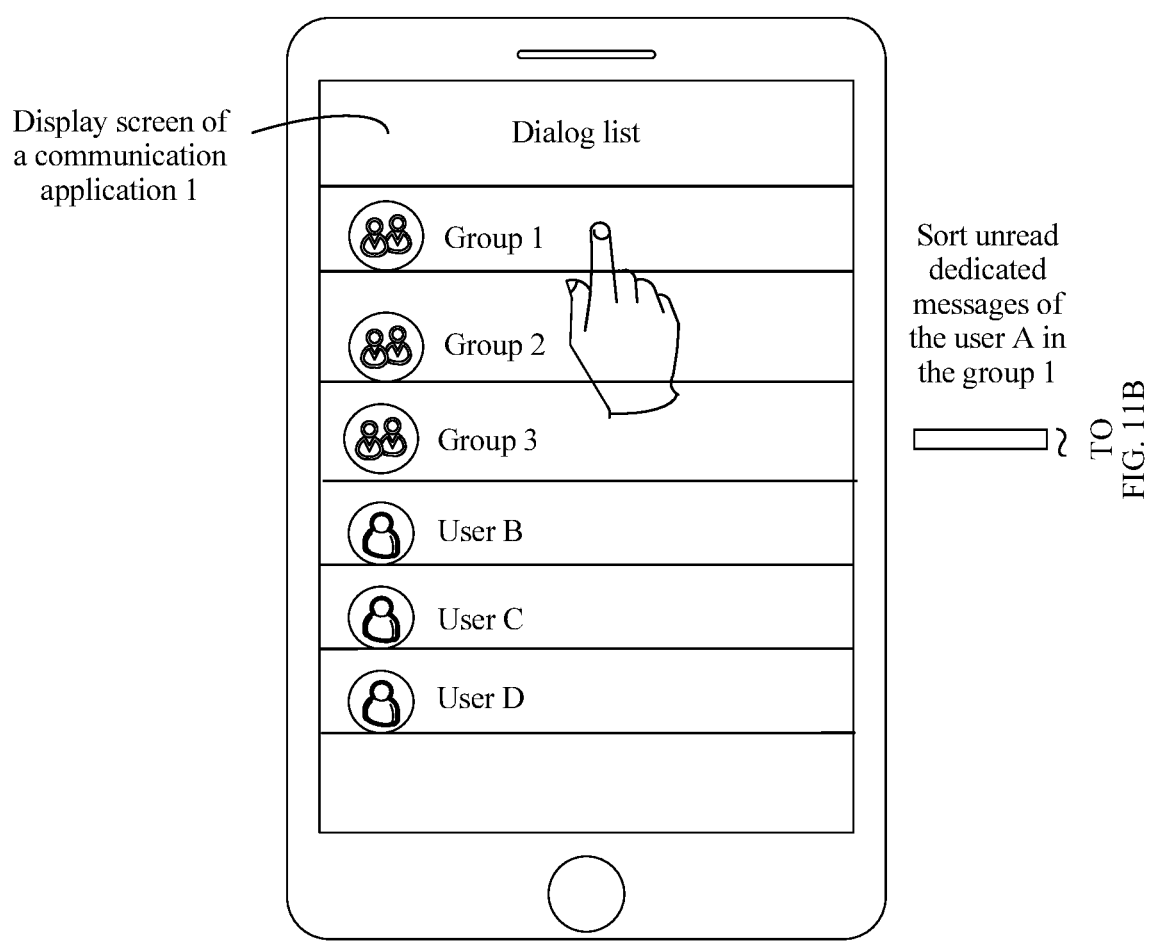
Figure 11B:
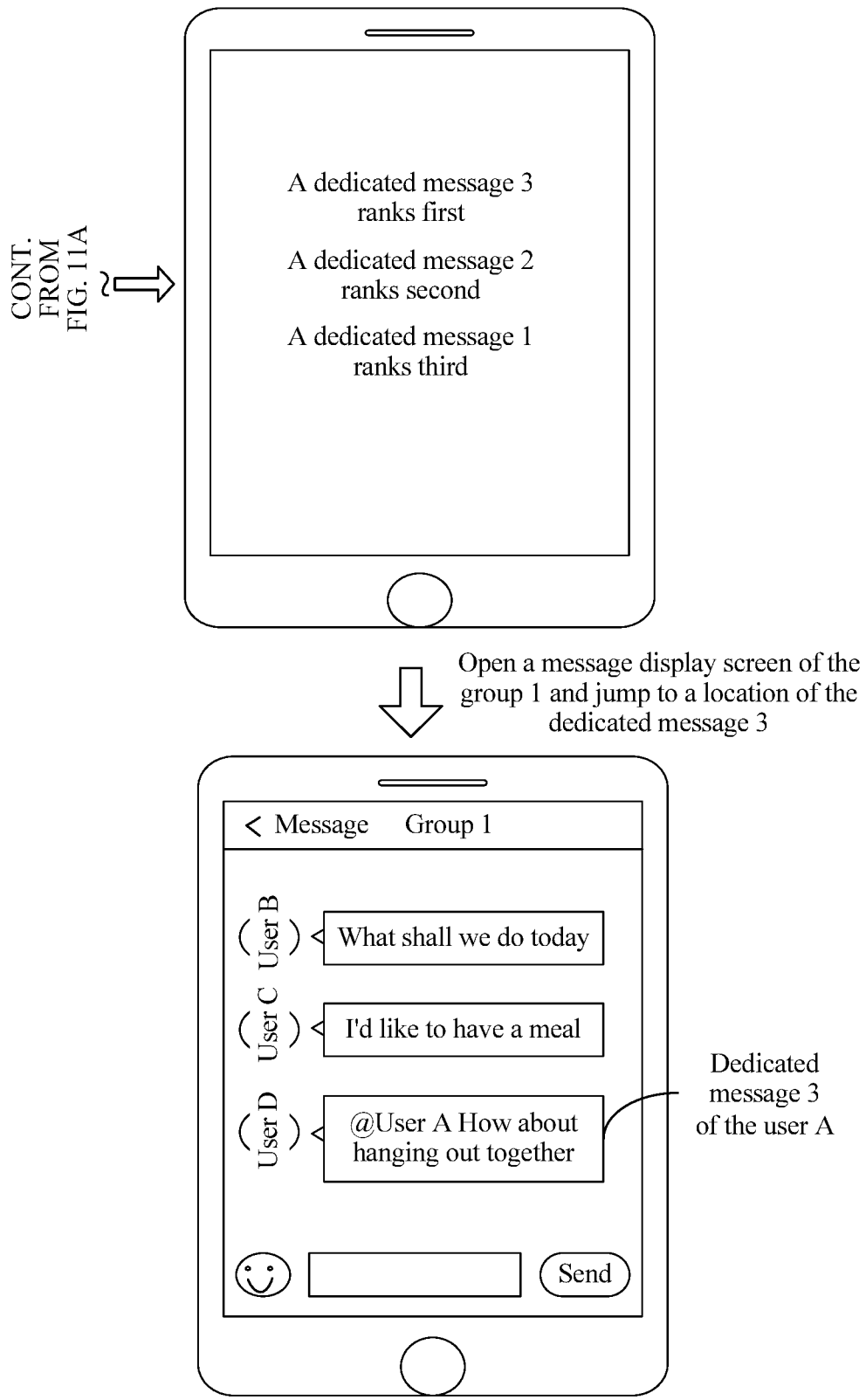

As shown in FIG. 11A and FIG. 11B, the user terminal detects that press force that is entered when a user A performs a press operation on an option column of a group 1 is greater than preset force, and the user terminal detects that unread dedicated messages of the user in the group 1 include a dedicated message 1, a dedicated message 2, and a dedicated message 3. A posting sequence of the three dedicated messages is: the dedicated message 3, the dedicated message 2, and the dedicated message 1. The user terminal may sort the three dedicated messages based on a sequence of posting times, or sort the three dedicated messages based on a reverse sequence of posting times. As shown in FIG. 11A and FIG. 11B, the user terminal sorts the three dedicated messages based on the sequence of posting times. A sorting sequence of the three dedicated messages is: the dedicated message 3, the dedicated message 2, and the dedicated message 1. The user terminal displays a message display screen of the group 1, and jumps to a location of the dedicated message 3 on the message display screen.

When there are a plurality of unread dedicated messages in the group, the user usually wants to view a latest unread dedicated message or an earliest unread dedicated message. According to this implementation, the user terminal can directly output the latest or the earliest unread dedicated message for the user to view.

In an optional implementation, after detecting that the press parameter is greater than the preset parameter and a plurality of unread dedicated messages of the user exist in the group of the communication application, the user terminal may display a selection list that includes message options. The message options in the selection list are in a one-to-one correspondence with the unread dedicated messages. The user may select a message option, and the user terminal displays an unread dedicated message corresponding to the message option selected by the user. Optionally, the user terminal may display, by using the message display screen of the group, the unread dedicated message corresponding to the message option selected by the user, or the user terminal may display, by using the dedicated message display screen described above, the unread dedicated message corresponding to the message option selected by the user. Optionally, a message option may include a sender name of a dedicated message corresponding to the message option, or may include a message summary of a dedicated message corresponding to the message option, so that the user can select the message option.

Figure 12A:
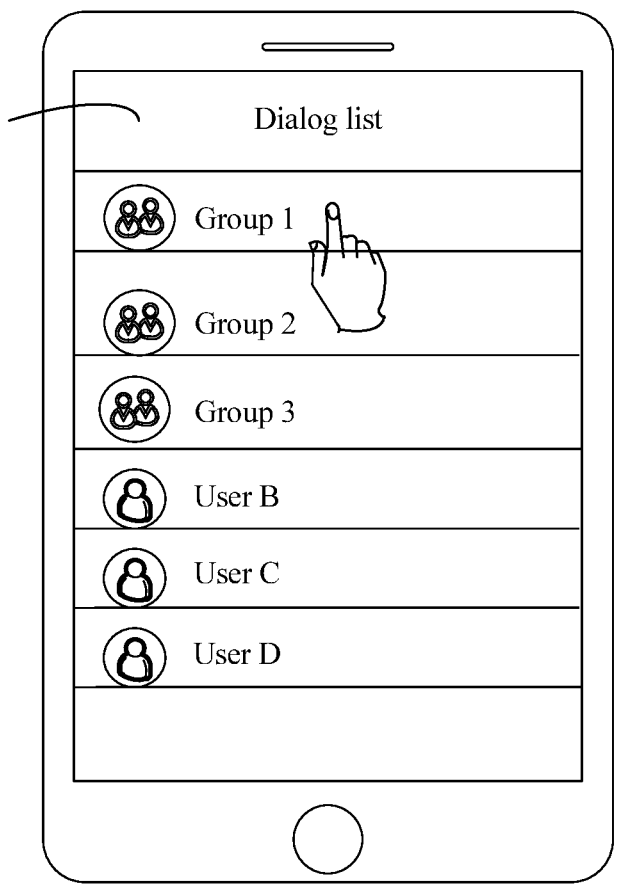
Figure 12B:
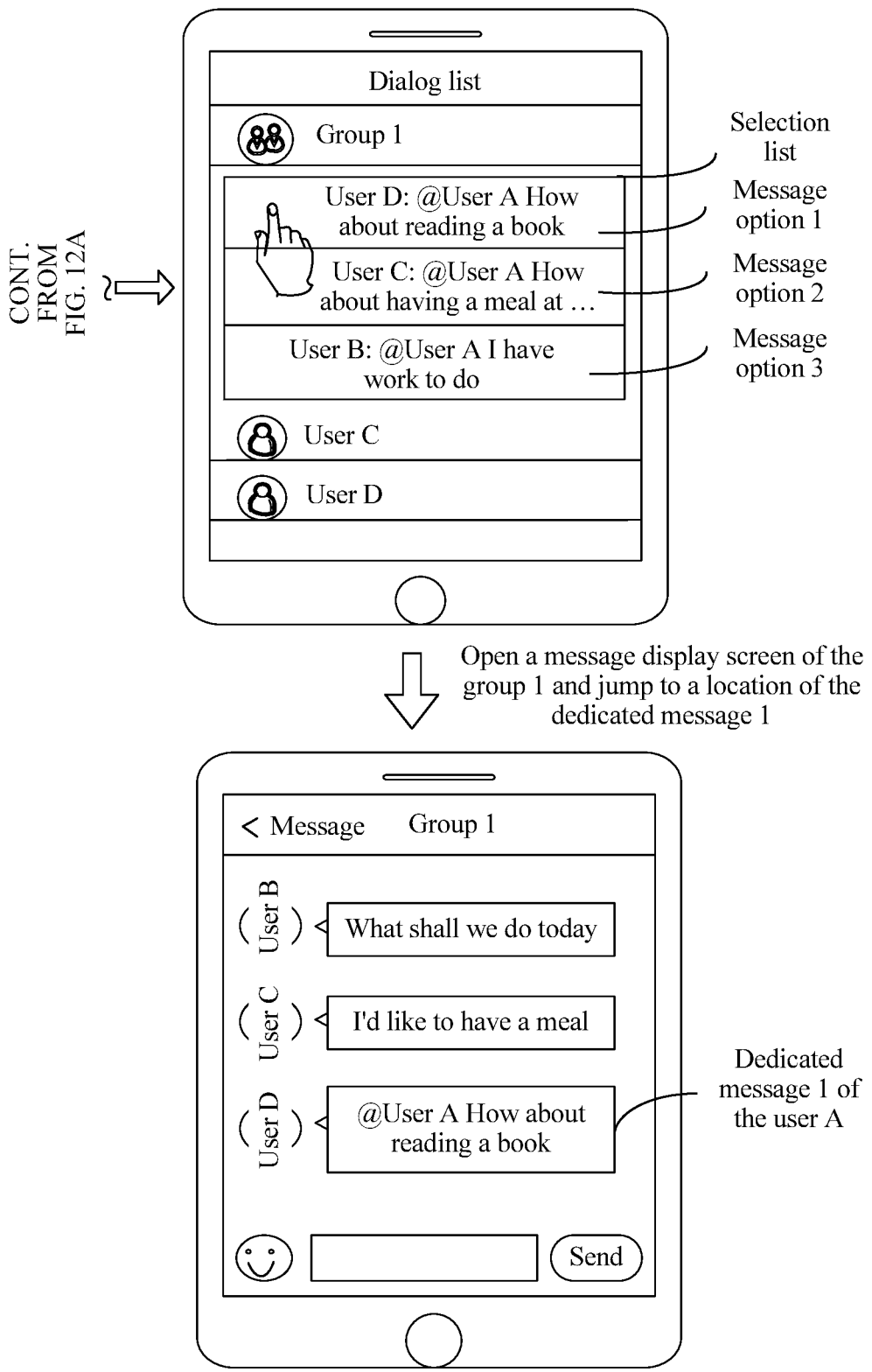

For example, as shown in FIG. 12A and FIG. 12B, the user terminal detects that press force that is entered when a user A performs a press operation on an option column of a group 1 is greater than preset force, and the user terminal detects that unread dedicated messages of the user in the group 1 include a dedicated message 1, a dedicated message 2, and a dedicated message 3. In this case, the user terminal may display a selection list shown in FIG. 12A and FIG. 12B. The selection list includes a message option 1 to a message option 3. The message option 1 is corresponding to the dedicated message 1, the message option 2 is corresponding to the dedicated message 2, and the message option 3 is corresponding to the dedicated message 3. As shown in FIG. 12A and FIG. 12B, after the user selects the message option 1, the user terminal displays a message display screen of the group 1, and jumps to a location of the dedicated message 1 on the message display screen.

Figure 13A:
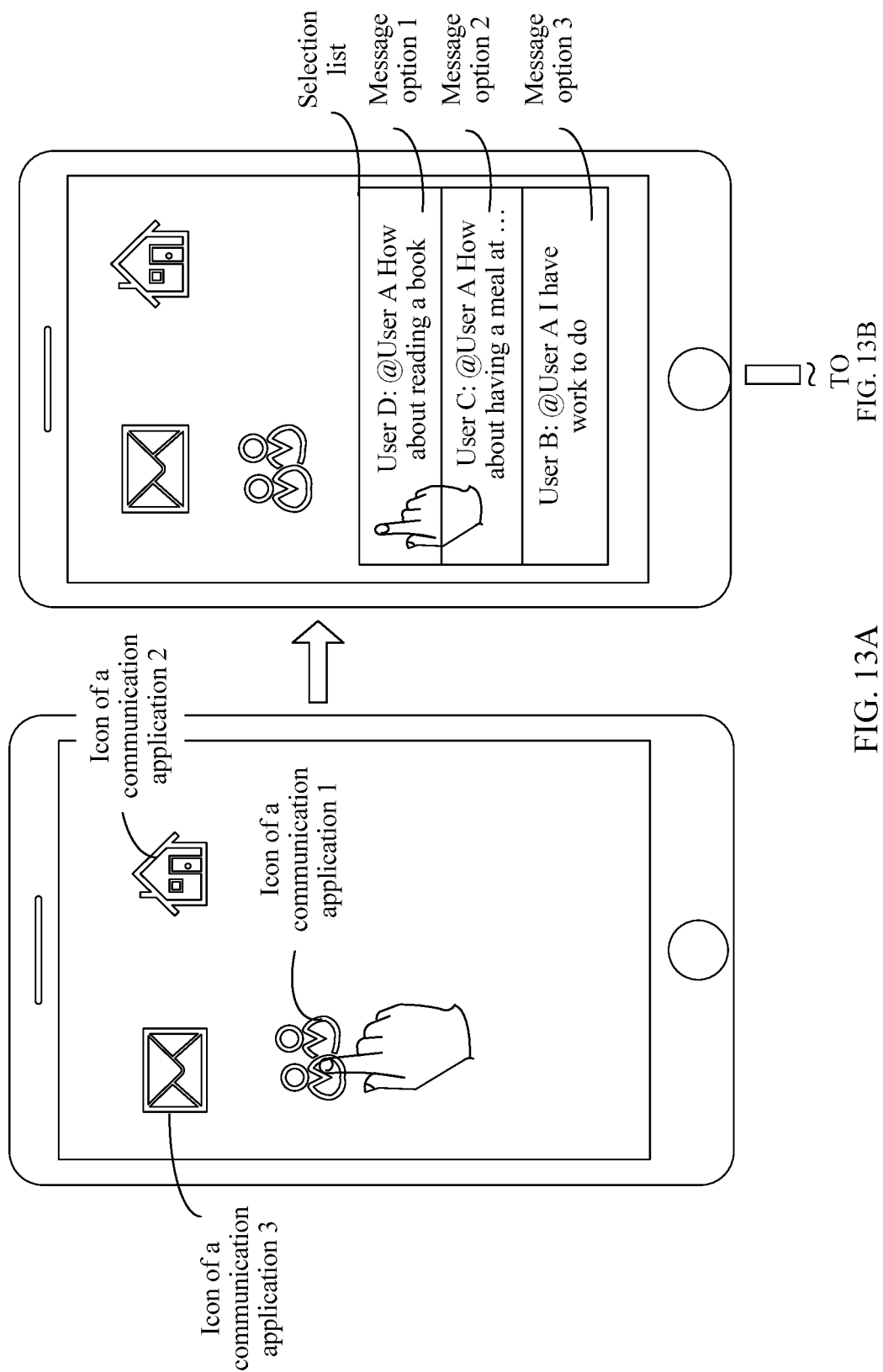
Figure 13B:
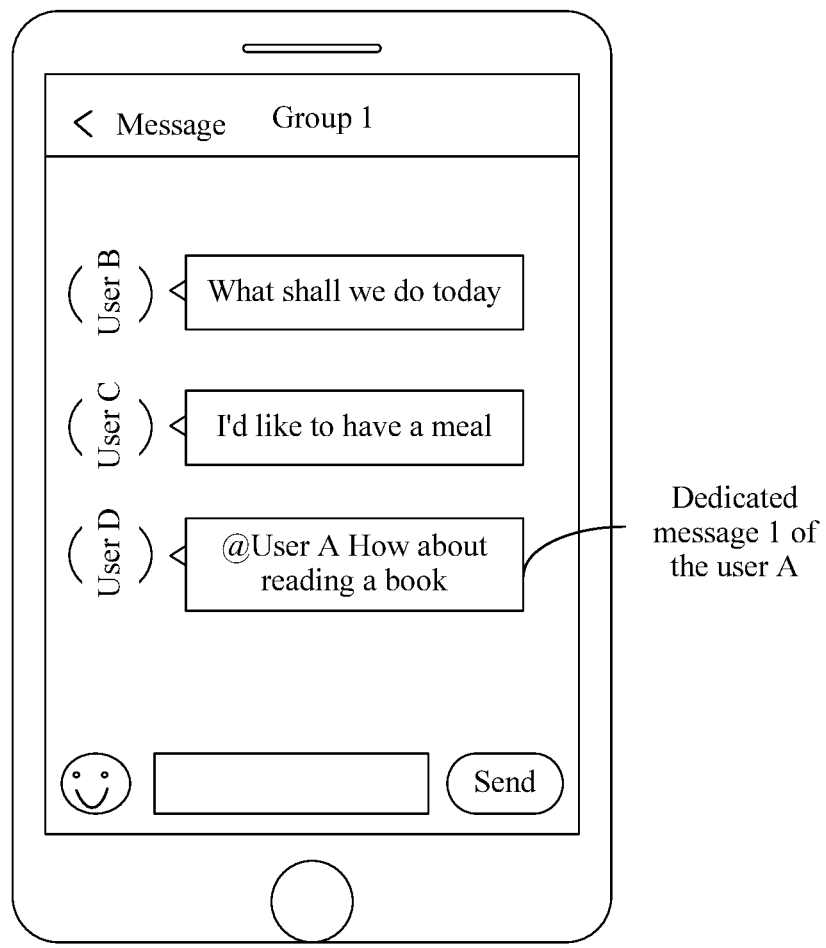

For another example, as shown in FIG. 13A and FIG. 13B, a communication application 1 includes two groups: a group 1 and a group 2. The user terminal detects that press force that is entered when a user A performs a press operation on an icon of the communication application 1 is greater than preset force, and that the group 1 includes a dedicated message 1 and a dedicated message 2 and the group 2 includes a dedicated message 3. In this case, the user terminal may display a selection list shown in FIG. 13A and FIG. 13B. The selection list includes a message option 1 to a message option 3. The message option 1 is corresponding to the dedicated message 1, the message option 2 is corresponding to the dedicated message 2, and the message option 3 is corresponding to the dedicated message 3. As shown in FIG. 13A and FIG. 13B, after the user selects the message option 1, the user terminal displays a message display screen of the group 1, and jumps to a location of the dedicated message 1 on the message display screen.

According to this implementation, when there are a plurality of unread dedicated messages in the group, the user may select an unread dedicated message as required. Therefore, it is more flexible to view an unread dedicated message.

Figure 14:
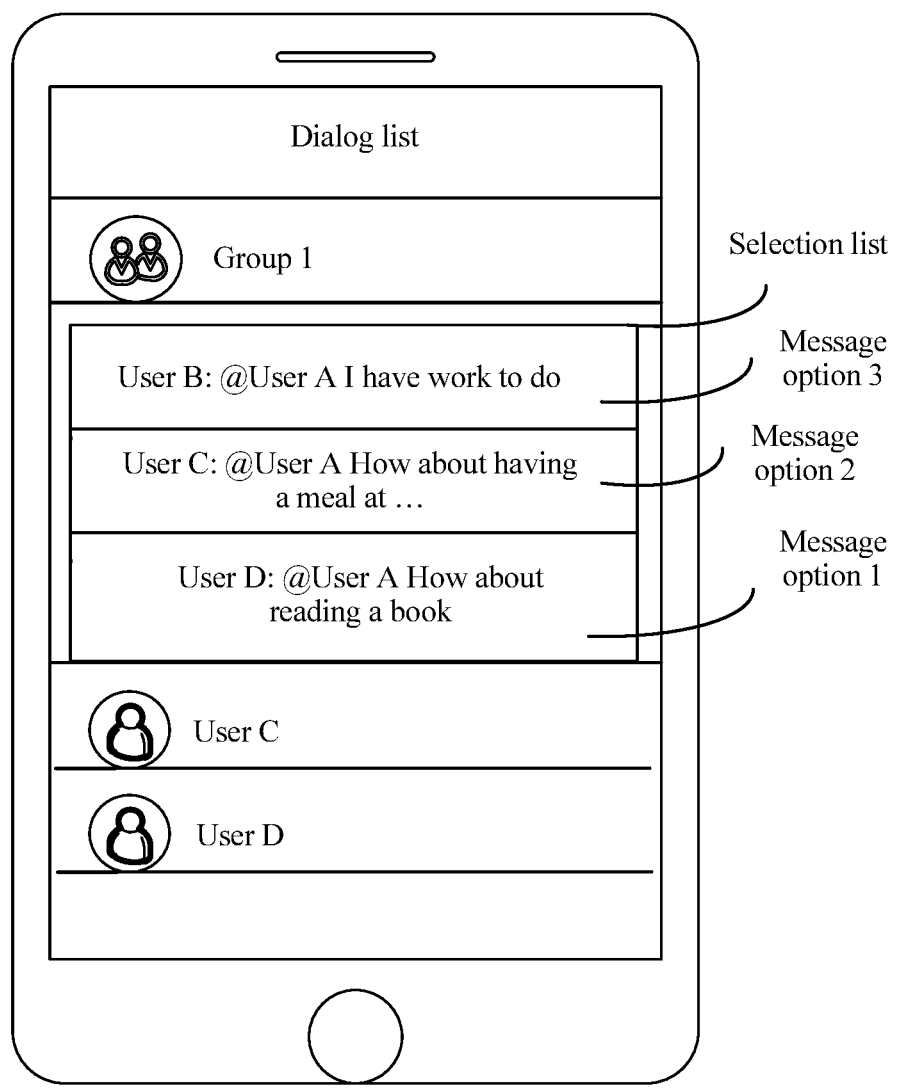
FIG. 14 is a schematic diagram of sorting of message options according to an embodiment of the present invention.

In an optional implementation, the user terminal may sort and display the message option 1 to the message option 3 based on a specific rule. For example, the user terminal may sort and display the message options based on the sequence of the posting times of the dedicated messages corresponding to the message options. If a sequence of posting times of the dedicated message 1 to the dedicated message 3 is: the dedicated message 3, the dedicated message 2, and the dedicated message 1, and the message options are sorted based on the sequence of the posting times of the dedicated messages, a sorting result of the message options may be shown in FIG. 14.

The message options are sorted and displayed based on the sequence of the posting times of the dedicated messages, so that the user can quickly select a message option.

In an optional implementation, the user may preset user priorities on the user terminal, for example, may set a priority of a user B to be greater than a priority of a user C, and set the priority of the user C to be greater than a priority of a user D. The user terminal may sort and display the message options based on priorities of senders of the dedicated messages. For example, if the user B posts a dedicated message 3, the user C posts a dedicated message 2, and the user D posts a dedicated message 1, and a message option 1 to a message option 3 are sorted based on priorities of senders of the dedicated messages, a sorting result may be shown in FIG. 14.

The message options are sorted and displayed based on the priorities of the senders of the dedicated messages, so that the user can quickly select a message option.

In an optional implementation, the user terminal may sort and display the message options based on priorities of keywords in the unread dedicated messages. For example, the user terminal may set a priority of a keyword "work" to be greater than a priority of a keyword "eat", and set the priority of the keyword "eat" to be greater than a priority of a keyword "read". If a dedicated message 1 includes the keyword "read", a dedicated message 2 includes the keyword "eat", and a dedicated message 3 includes the keyword "work", and a message option 1 to a message option 3 are sorted based on priorities of keywords of the dedicated messages, a sorting result may be shown in FIG. 14.

The message options are sorted and displayed based on the priorities of the keywords in the unread dedicated messages, so that the user can quickly select a message option.

In an optional implementation, after the user terminal detects that the press parameter is greater than the preset parameter and a plurality of unread dedicated messages of the user exist in the group of the communication application, the user terminal may group the unread dedicated messages into corresponding time periods based on posting times of the unread dedicated messages, to classify the unread dedicated messages. After the user terminal classifies the unread dedicated messages, if the unread dedicated messages are grouped into a plurality of time periods, the user terminal outputs a selection list that includes options of the plurality of time periods. The user may select a time period from the selection list, and the user terminal displays an unread dedicated message included in the time period. Optionally, the user terminal may display, by using the message display screen of the group, the unread dedicated message included in the time period, or the user terminal may display, by using the dedicated message display screen described above, the unread dedicated message included in the time period.

In this implementation, optionally, if the time period selected by the user includes a plurality of unread dedicated messages, the user terminal may output the dedicated message display screen described above to display all the unread dedicated messages included in the time period selected by the user.

In this implementation, optionally, if the time period selected by the user includes a plurality of unread dedicated messages, the user terminal may first sort the plurality of unread dedicated messages, and then display an unread dedicated message on a preset location by using the message display screen of the group or the dedicated message display screen described above.

In this implementation, optionally, if the time period selected by the user includes a plurality of unread dedicated messages, the user terminal may output a selection list. Message options in the selection list are in a one-to-one correspondence with the unread dedicated messages. The user may select a message option, the user terminal may display, by using the message display screen of the group or the dedicated message display screen described above, an unread dedicated message corresponding to the message option selected by the user.

Figure 15A:
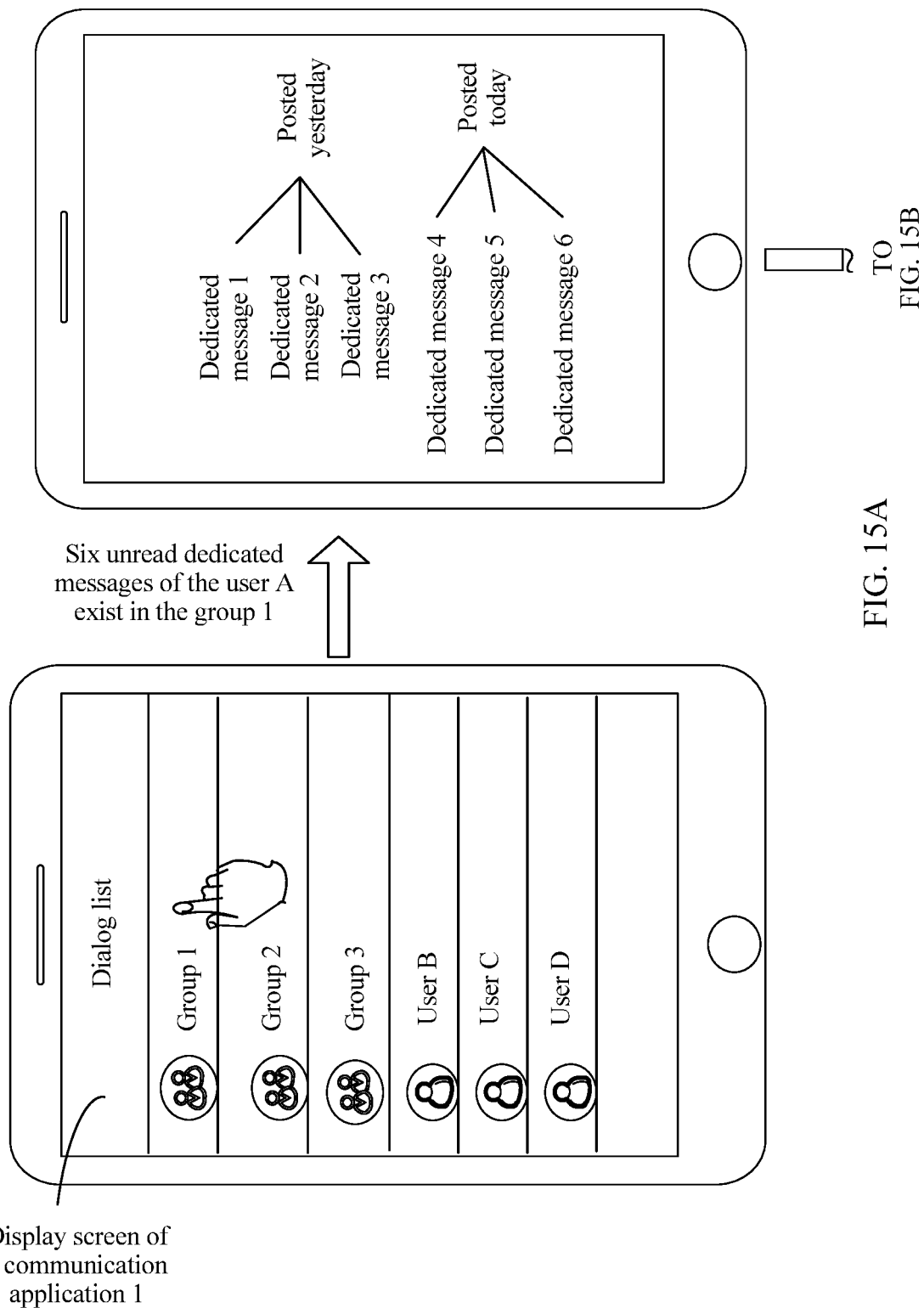
Figure 15B:
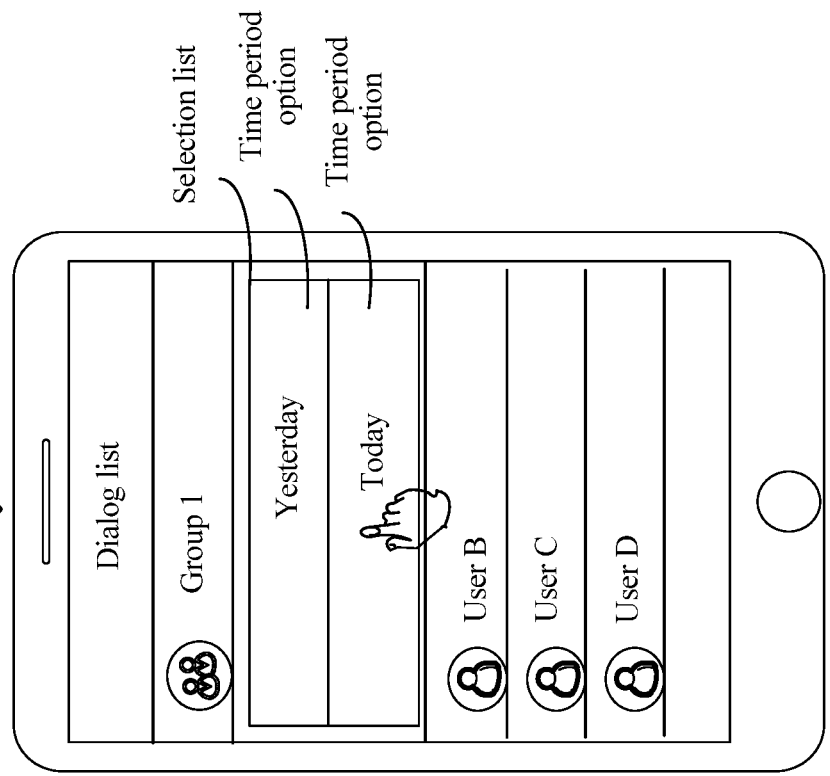
Figure 15B:
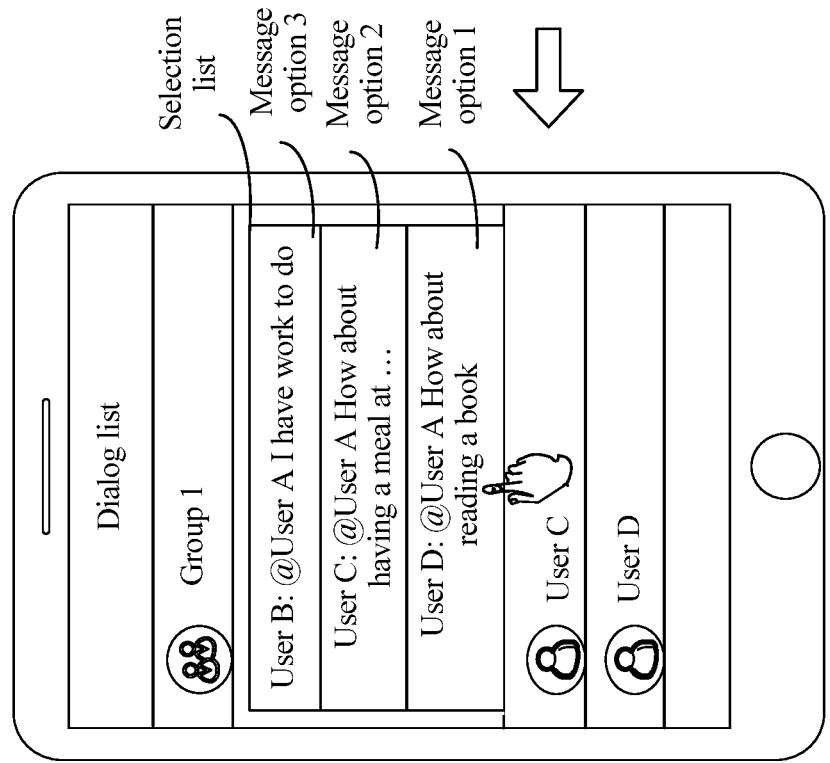
Figure 15C:
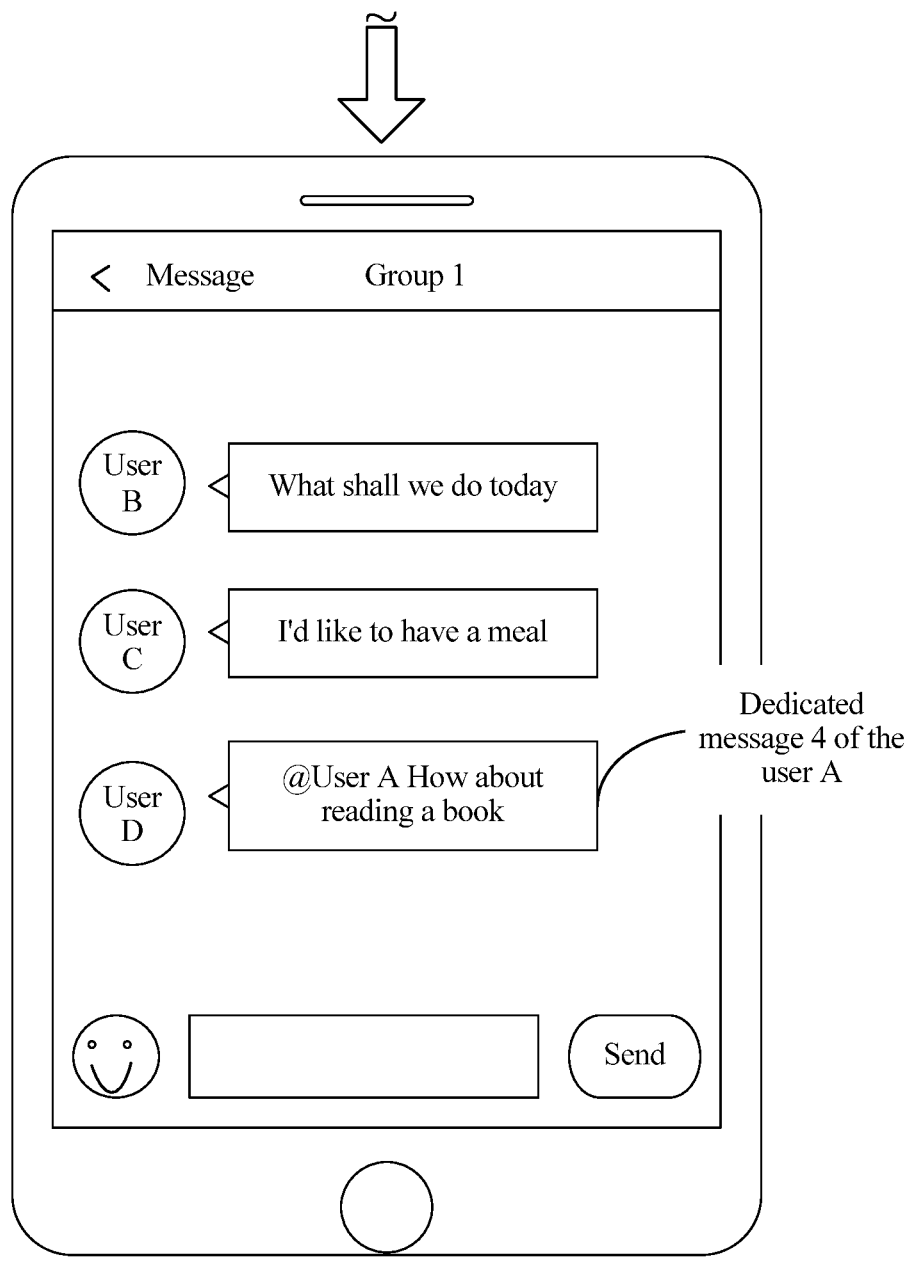

For example, as shown in FIG. 15A, FIG. 15B, and FIG. 15C, after the user terminal detects that press force that is entered when the user presses a column of a group 1 is greater than preset force, the user terminal detects six unread dedicated messages of the user in the group 1 of a communication application: a dedicated message 1 to a dedicated message 6. The dedicated message 1 to the dedicated message 3 were posted yesterday, and the dedicated message 4 to the dedicated message 6 were posted today. The user terminal groups, based on posting times of the six unread dedicated messages, the dedicated message 1 to the dedicated message 3 into a time period of yesterday and the dedicated message 4 to the dedicated message 6 into a time period of today. As shown in FIG. 15A, FIG. 15B, and FIG. 15C, the user terminal may output a time period selection list, and the list includes time period options: yesterday and today. The user may select a time period. As shown in FIG. 15A, FIG. 15B, and FIG. 15C, after the user selects the time period of today, the user terminal outputs a message option 1 to a message option 3 that are corresponding to the dedicated message 4 to the dedicated message 6. After the user selects the message option 1 corresponding to the dedicated message 4, the user terminal displays a message display screen of the group 1, and jumps to a location of the dedicated message 4.

When there are many unread dedicated messages, the unread dedicated messages are grouped into corresponding time periods based on posting times of the unread dedicated messages. The user may select, from a selection list that outputs options that include the plurality of time periods, a time period in which the user is interested, so as to view an unread dedicated message posted in the time period. Therefore, according to this implementation, the user can find an unread dedicated message more quickly as required.

In an optional implementation, after the user terminal displays the unread dedicated message by using the message display screen of the group, the user terminal may detect a press parameter that is entered when the user performs a press operation on the message display screen of the group. If the press parameter is greater than a preset parameter (the preset parameter may be the same as or different from the foregoing preset parameter), the user terminal jumps to a location of a next unread dedicated message on the message display screen of the group, so that the user can view the another unread dedicated message. Optionally, the next unread dedicated message may be an unread dedicated message posted before a currently displayed dedicated message, or the another unread dedicated message may be an unread dedicated message posted after the currently displayed dedicated message.

Optionally, the press parameter may be press force or press duration. Correspondingly, the preset parameter may be preset force or preset duration.

Figure 16A:
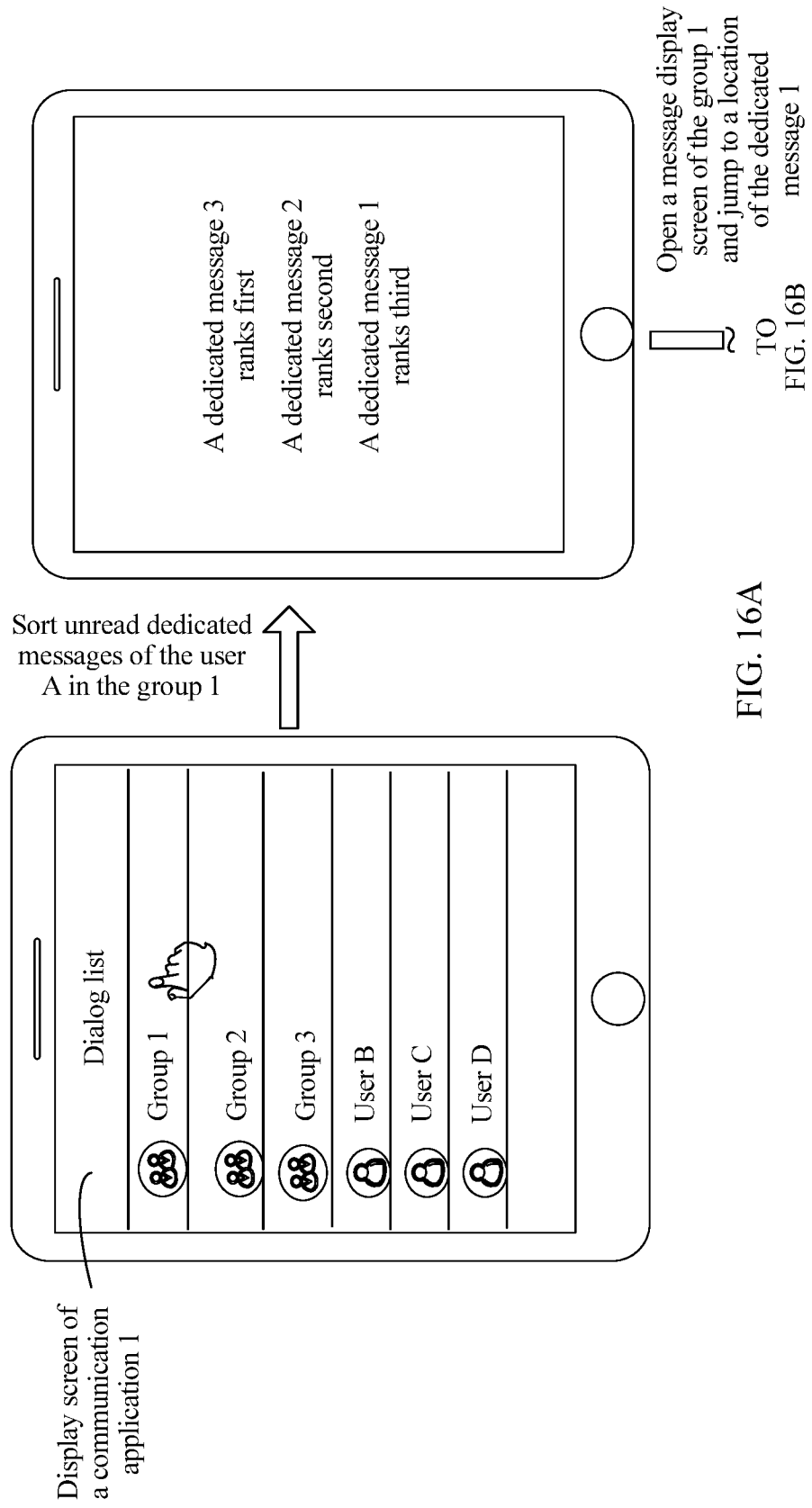
Figure 16B:
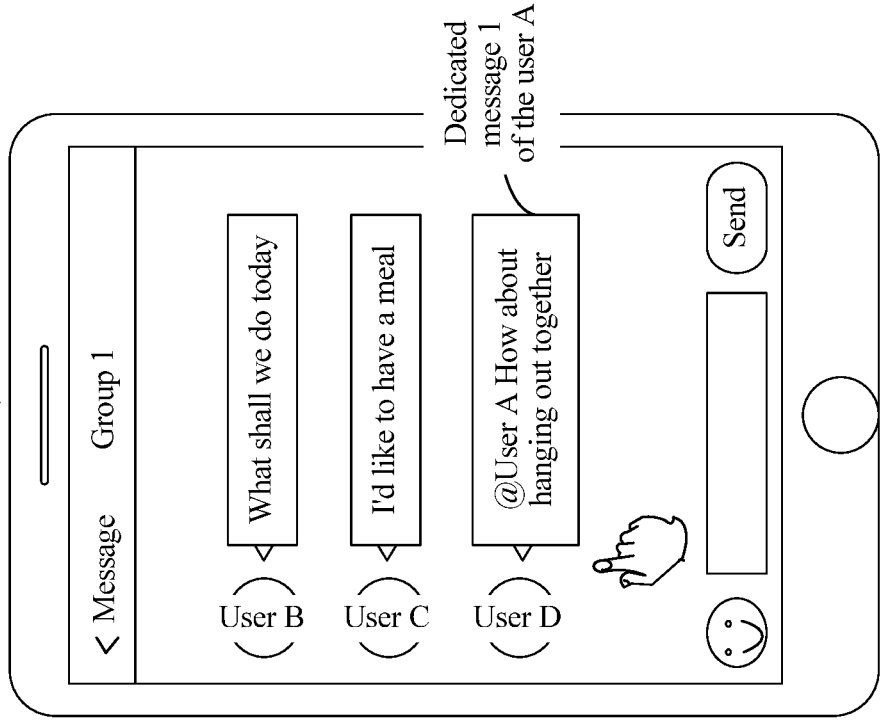
Figure 16B:
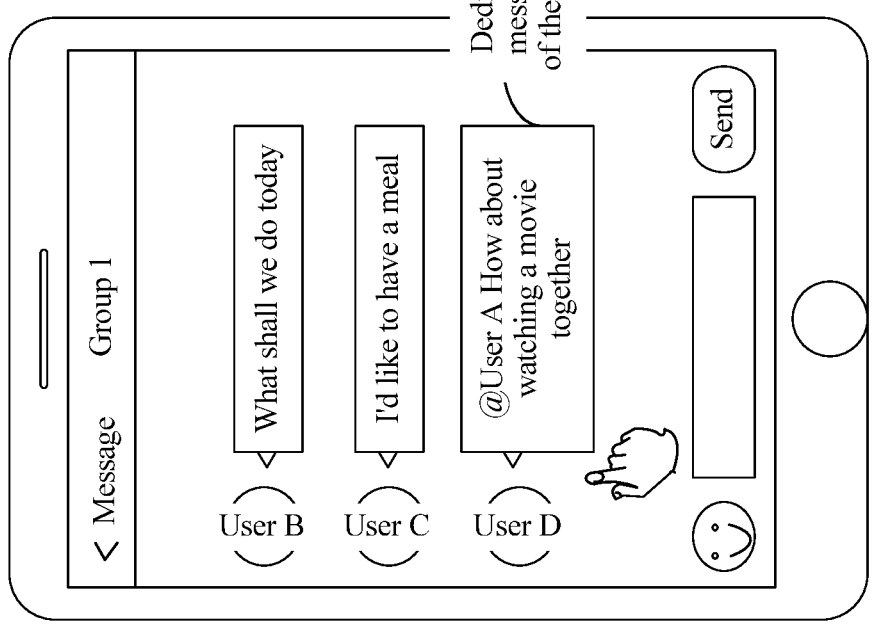
Figure 16C:
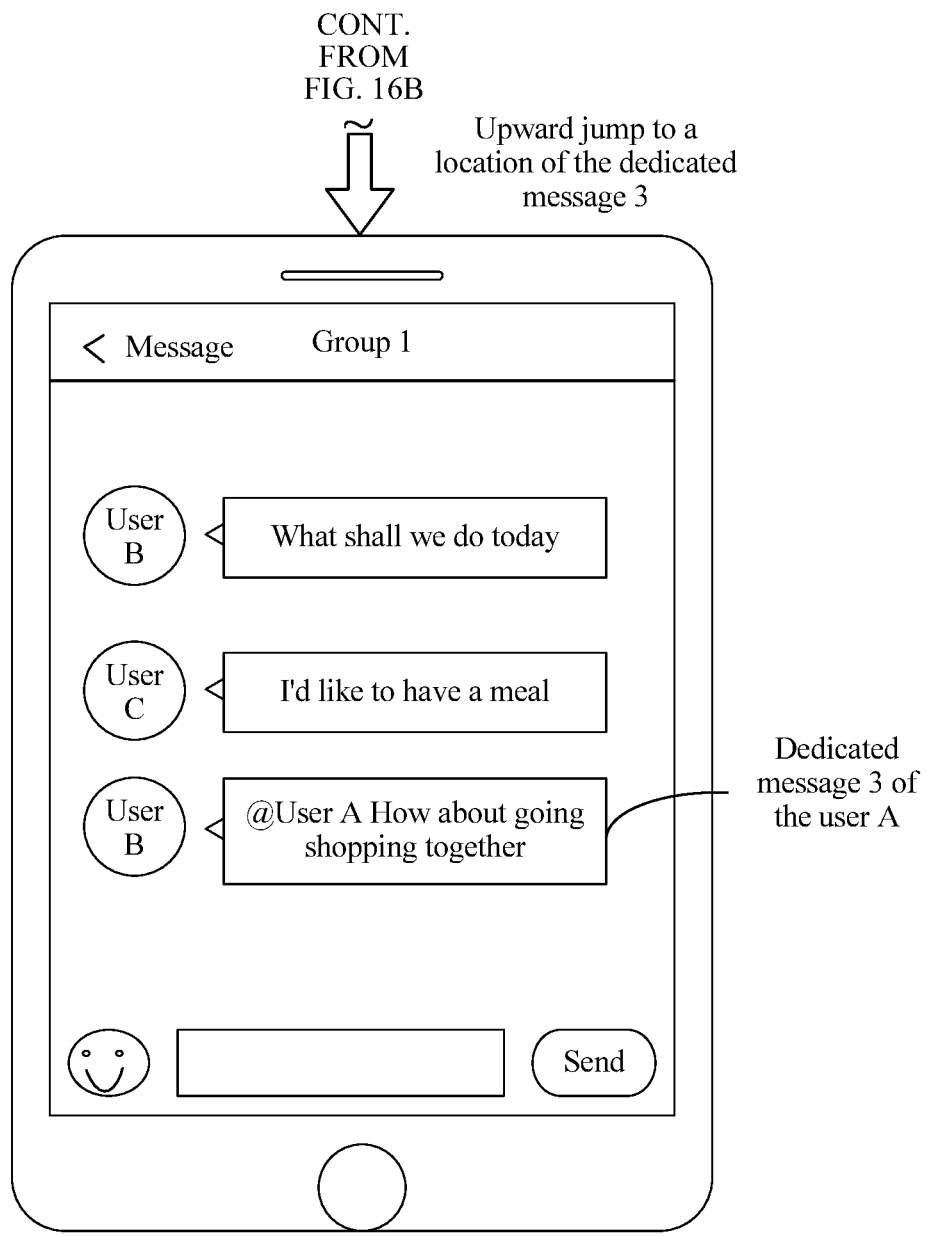

For example, as shown in FIG. 16A, FIG. 16B, and FIG. 16C, the user terminal detects that press force that is entered when a user A performs a press operation on an option column of a group 1 is greater than preset force, and the user terminal detects that unread dedicated messages of the user A in the group 1 include a dedicated message 1, a dedicated message 2, and a dedicated message 3. The user terminal sorts the three dedicated messages based on a sequence of posting times, and learns that a sorting sequence is: the dedicated message 3, the dedicated message 2, and the dedicated message 1. The user terminal displays a message display screen of the group 1, and jumps to a location of the dedicated message 1 on the message display screen. As shown in FIG. 16A, FIG. 16B, and FIG. 16C, the user performs a press operation on the message display screen of the group 1, and press force entered by using the press operation is greater than the preset force. In this case, the user terminal jumps to a location of the dedicated message 2 on the message display screen of the group 1. As shown in FIG. 16A, FIG. 16B, and FIG. 16C, the user A may continue to perform a press operation on the message display screen of the group 1. If press force entered by using the press operation is greater than the preset force, the user terminal jumps to a location of the dedicated message 3 on the message display screen of the group 1.

According to this implementation, a press operation is performed on the message display screen of the group, so that other unread dedicated messages in the group can be conveniently viewed.

In an optional implementation, after the user terminal displays the unread dedicated message by using the message display screen of the group, a specific implementation in which the user terminal detects the press parameter that is entered when the user performs a press operation on the message display screen of the group may be as follows: The user terminal detects a press parameter that is entered when the user performs a press operation on a displayed dedicated message.

Figure 17A:
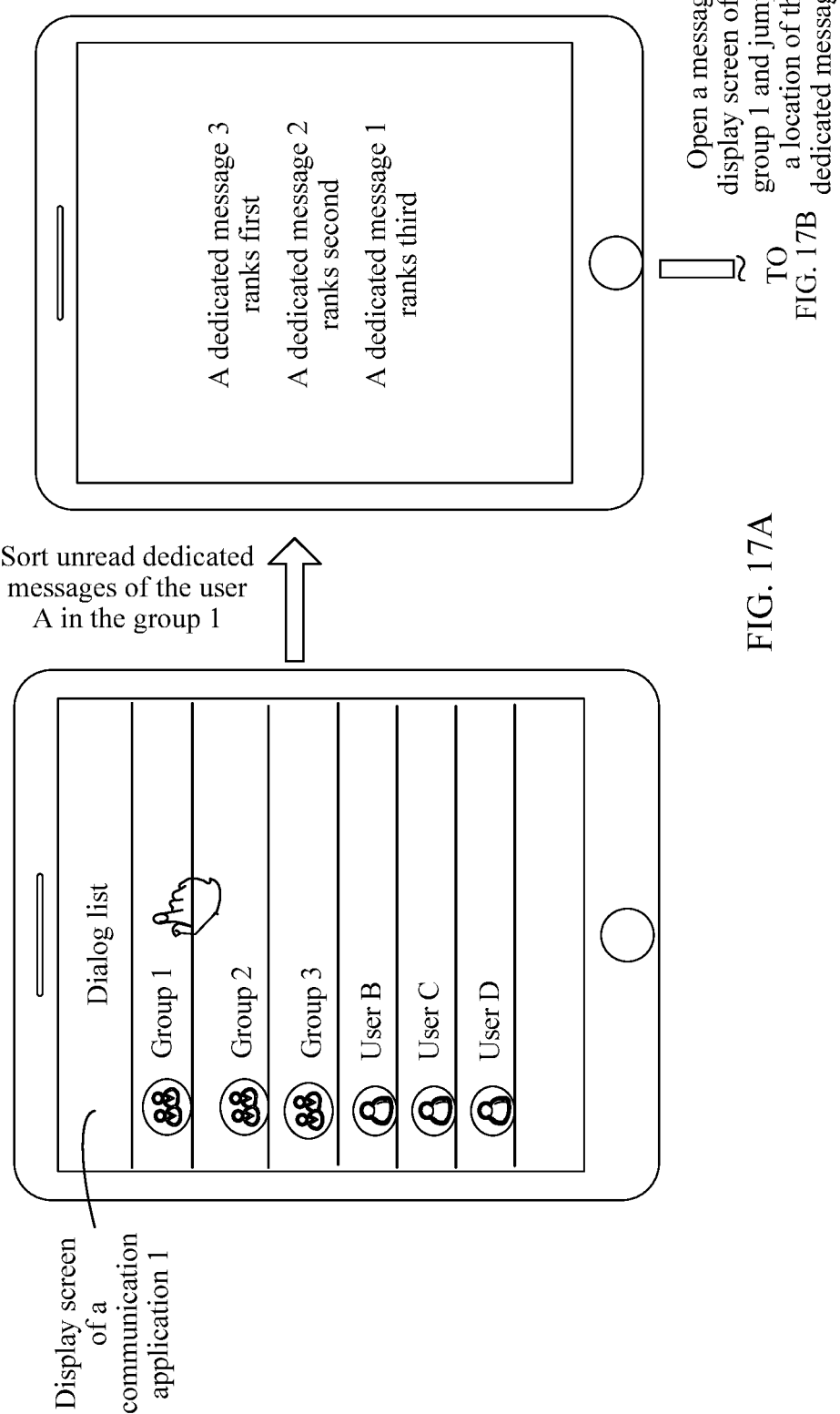
Figure 17C:
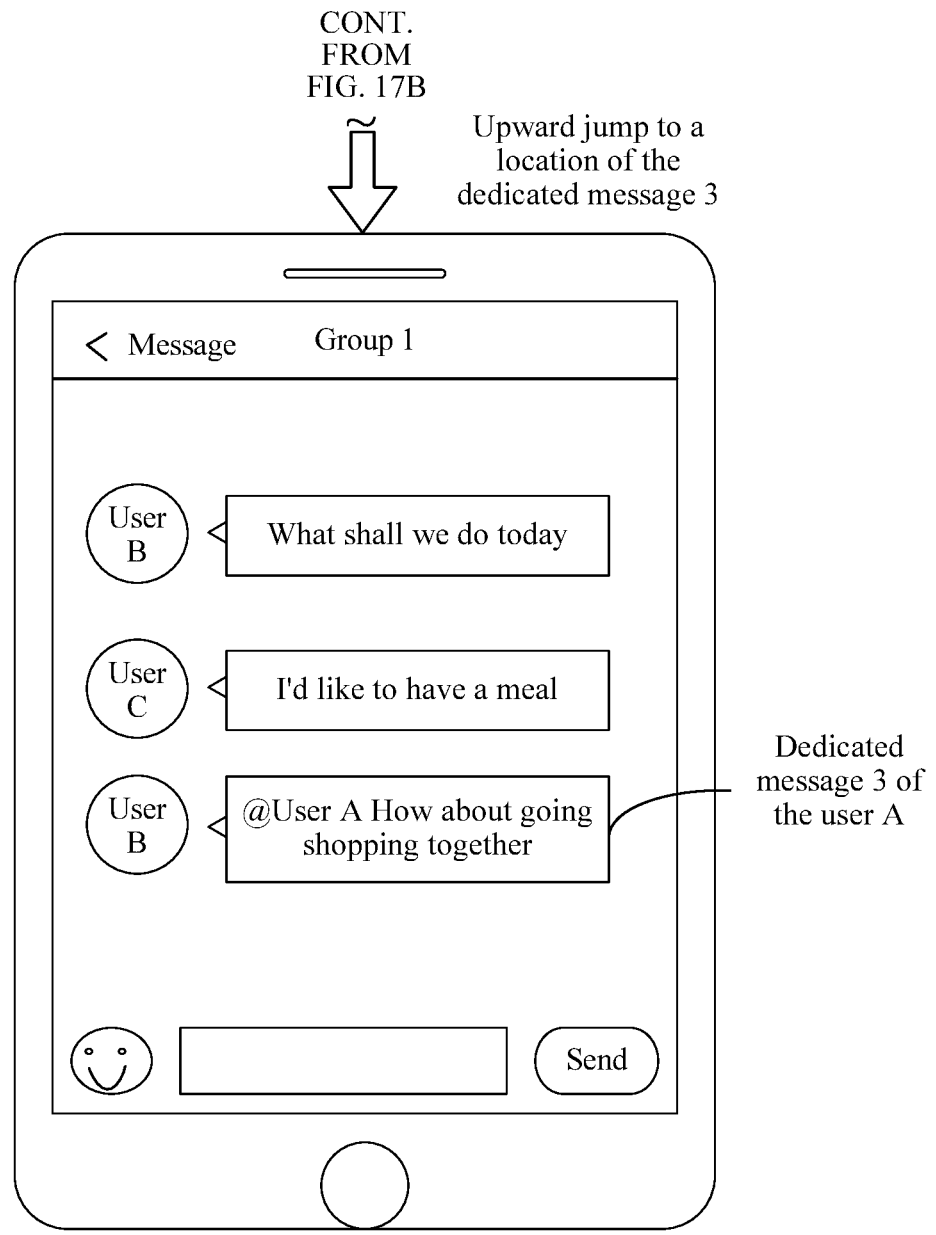

For example, as shown in FIG. 17A, FIG. 17B, and FIG. 17C, unread dedicated messages of a user A in a group 1 include a dedicated message 1, a dedicated message 2, and a dedicated message 3. A posting sequence of the three dedicated messages is: the dedicated message 3, the dedicated message 2, and the dedicated message 1. As shown in FIG. 17A, FIG. 17B, and FIG. 17C, after the user terminal displays a message display screen of the group 1 and jumps to a location of the dedicated message 1 on the message display screen, the user may perform a press operation on the dedicated message 1 on the message display screen of the group 1. If press force entered by using the press operation is greater than preset force, the user terminal jumps to a location of the dedicated message 2 on the message display screen of the group 1. As shown in FIG. 17A, FIG. 17B, and FIG. 17C, the user terminal may continue to perform a press operation on the dedicated message 2. If press force entered by using the press operation is greater than the preset force, the user terminal jumps to a location of the dedicated message 3 on the message display screen of the group 1.

According to this implementation, a press operation is performed on a dedicated message on the message display screen of the group, so that other unread dedicated messages in the group can be conveniently viewed.

In an optional implementation, after displaying the unread dedicated message by using the message display screen of the group, if the user terminal detects another unread dedicated message of the user, the user terminal may provide the user with a prompt of a quantity of unread dedicated messages on the message display screen, so that the user determines whether to continue to press the message display screen or a dedicated message displayed on the message display screen, so as to view a next unread dedicated message. As shown in FIG. 17A, FIG. 17B, and FIG. 17C, after jumping to the location of the dedicated message 1 on the message display screen of the group 1, the user terminal may display a prompt of two unread dedicated messages on the message display screen. After jumping to the location of the dedicated message 2 on the message display screen of the group 1, the user terminal may display a prompt of one unread dedicated message on the message display screen.

In an optional implementation, after the user terminal displays the unread dedicated message on the message display screen of the group, the user terminal may display at least one of an upward jump arrow or a downward jump arrow on the message display screen. The user terminal jumps to a location of a previous unread dedicated message on the message display screen of the group when detecting a press operation performed by the user on the upward jump arrow. The previous unread dedicated message may be an unread dedicated message posted before a currently displayed message. The user terminal jumps to a location of a next unread dedicated message on the message display screen of the group when detecting a press operation performed by the user on the downward jump arrow. The next unread dedicated message may be an unread dedicated message posted after the currently displayed message.

Figure 18A:
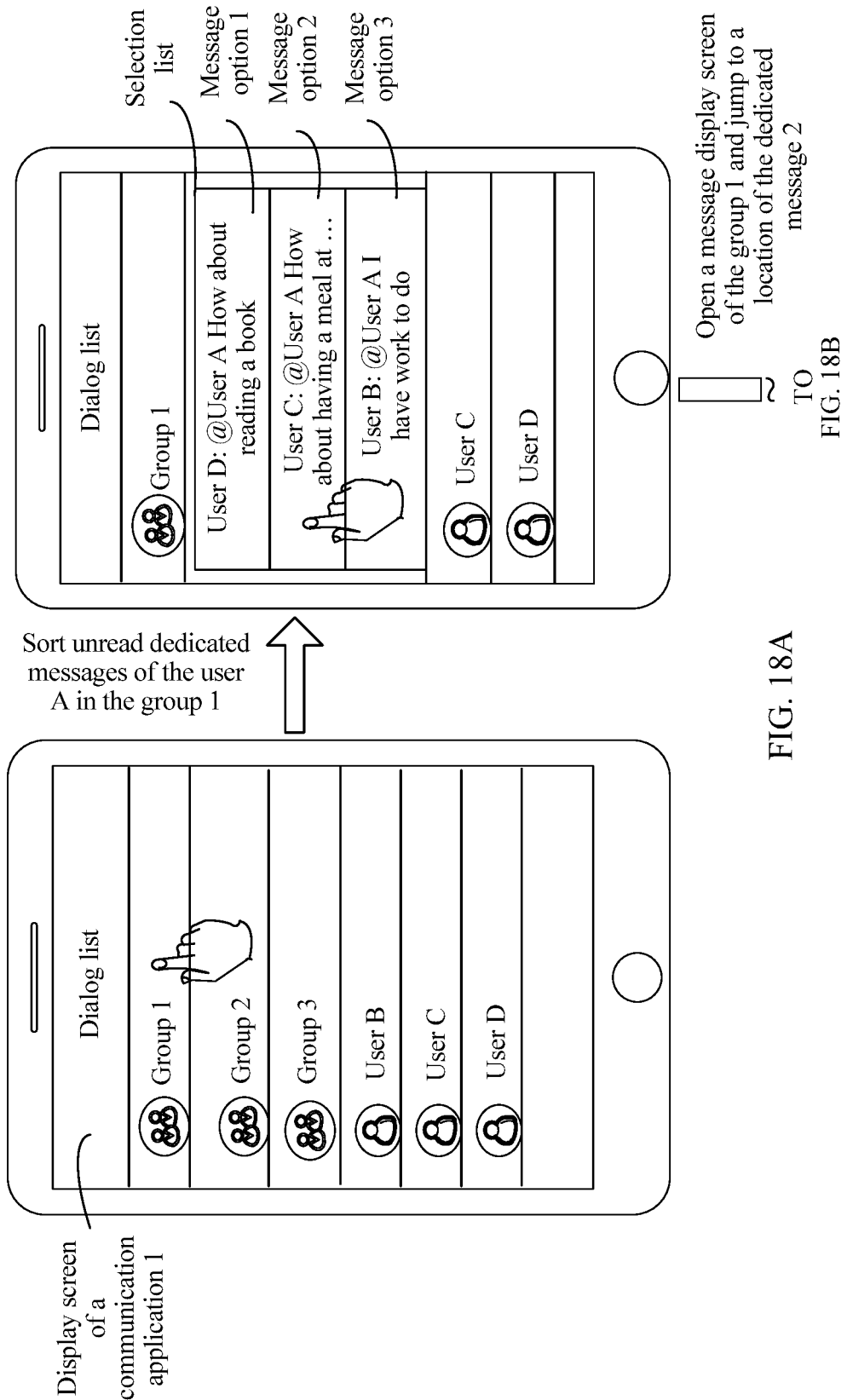
Figure 18B:
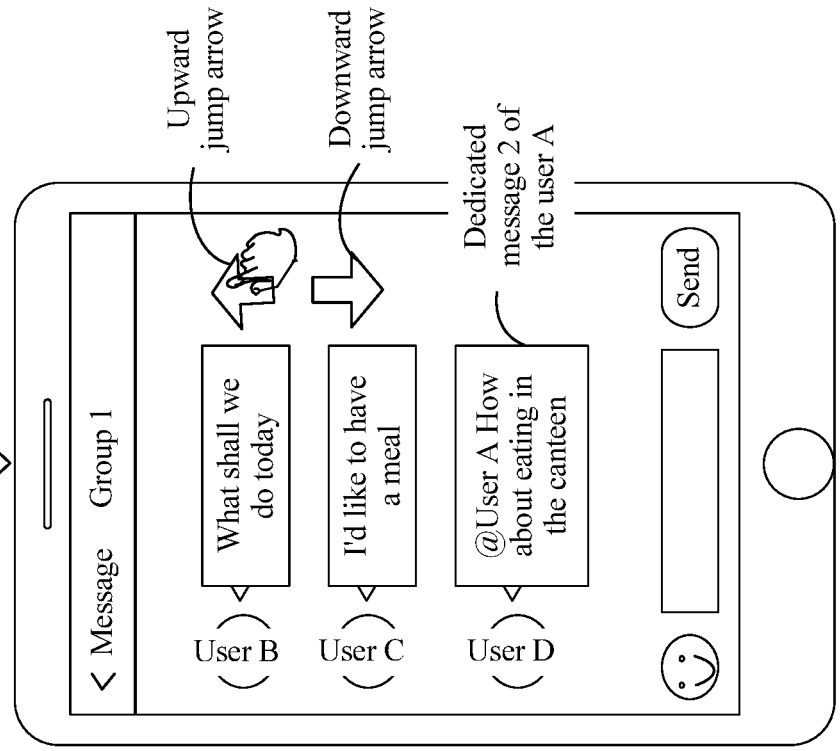
Figure 18B:
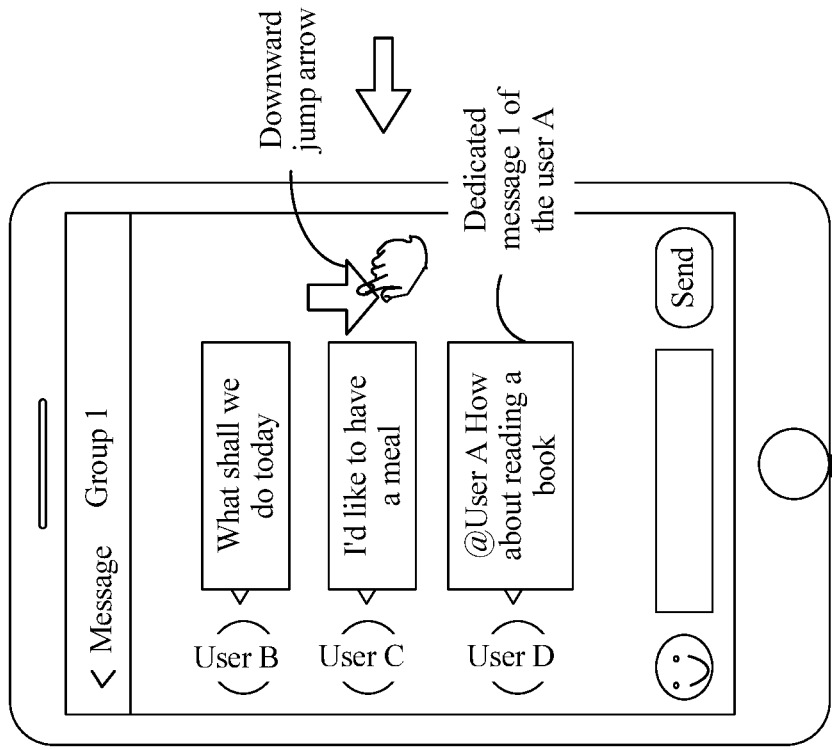
Figure 18C:
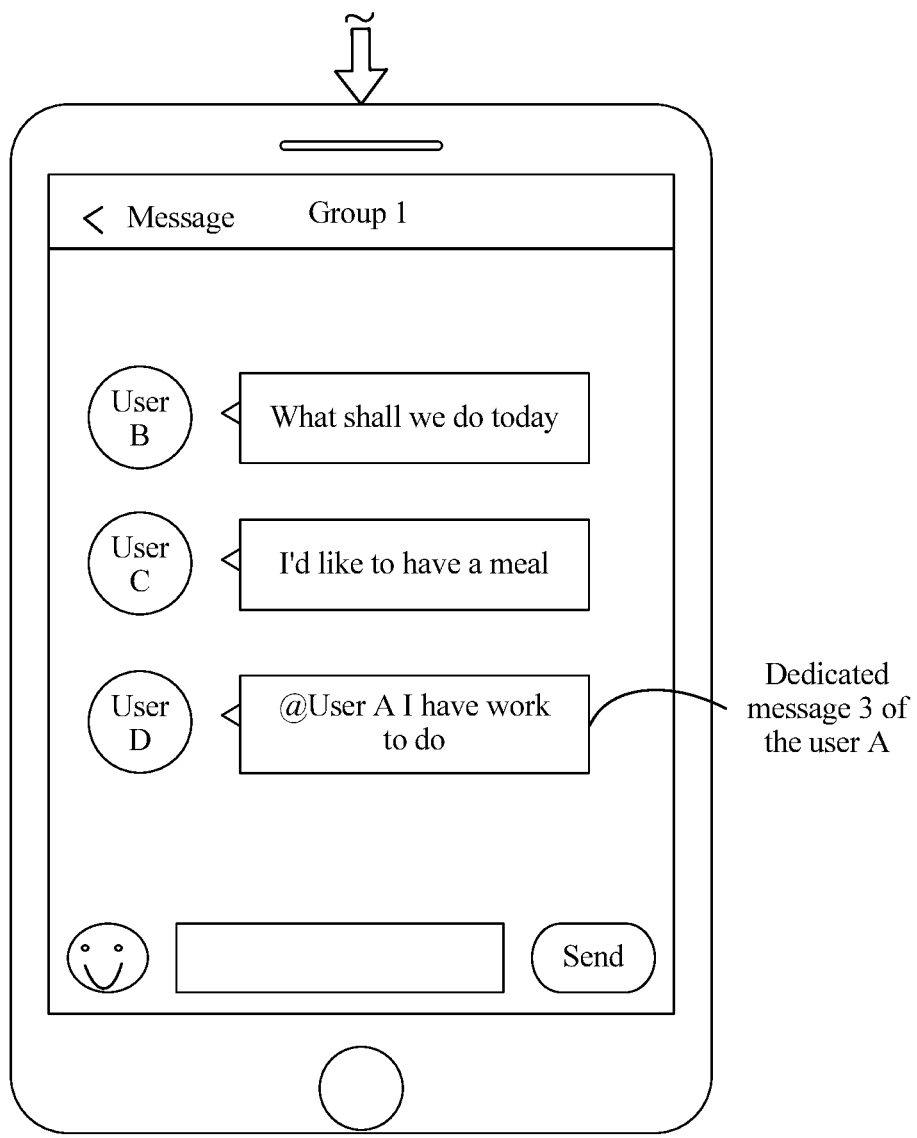

For example, the user terminal detects that press force that is entered when a user A performs a press operation on an option column of a group 1 is greater than preset force, and the user terminal detects that unread dedicated messages of the user in the group 1 include a dedicated message 1, a dedicated message 2, and a dedicated message 3. In this case, the user terminal may output a selection list shown in FIG. 18A, FIG. 18B, and FIG. 18C. The selection list includes a message option 1 to a message option 3. The message option 1 is corresponding to the dedicated message 1, the message option 2 is corresponding to the dedicated message 2, and the message option 3 is corresponding to the dedicated message 3. As shown in FIG. 18A, FIG. 18B, and FIG. 18C, after the user selects the message option 2, the user terminal displays a message display screen of the group 1, and jumps to a location of the dedicated message 2 on the message display screen. The dedicated message 1 is posted before the dedicated message 2, and the dedicated message 2 is posted before the dedicated message 3. As shown in FIG. 18A, FIG. 18B, and FIG. 18C, after the user terminal jumps to the location of the dedicated message 2 on the message display screen, the user terminal displays an upward jump arrow and a downward jump arrow on the message display screen of the group 1. The user terminal jumps to a location of the dedicated message 1 on the message display screen of the group 1 after the user taps the upward jump arrow. The user terminal jumps to a location of the dedicated message 3 on the message display screen of the group 1 after the user taps the downward jump arrow. Optionally, directions to which the upward jump arrow and the downward jump arrow point are not limited. The directions to which the upward jump arrow and the downward jump arrow point may be shown in FIG. 18A, FIG. 18B, and FIG. 18C, or the upward jump arrow may point to the left and the downward jump arrow may point to the right.

According to this implementation, the user taps the upward jump arrow and the downward jump arrow on the message display screen of the group, so that other unread dedicated messages in the group can be conveniently viewed.

A second embodiment of the present invention provides a graphical user interface. The graphical user interface is applicable to the user terminal in the foregoing method embodiment. The graphical user interface may include any screen of the user terminal in the foregoing method embodiment, such as any one or more screens in FIG. 3 to FIG. 18A, FIG. 18B, and FIG. 18C. For detailed descriptions of a screen of the graphical user interface and a change or switching of the screen of the graphical user interface, refer to descriptions of FIG. 3 to FIG. 18A, FIG. 18B, and FIG. 18C, and details are not described herein.

A third embodiment of the present invention provides a user terminal. The user terminal is divided into functional units according to the foregoing method example. For example, a functional unit corresponding to each function may be obtained by means of division, or two or more functions may be integrated into one unit. The integrated unit may be implemented in a form of hardware, or may be implemented in a form of a software functional unit. The hardware or the software includes one or more units corresponding to the foregoing function. The unit may be software and/or hardware.

Figure 19:
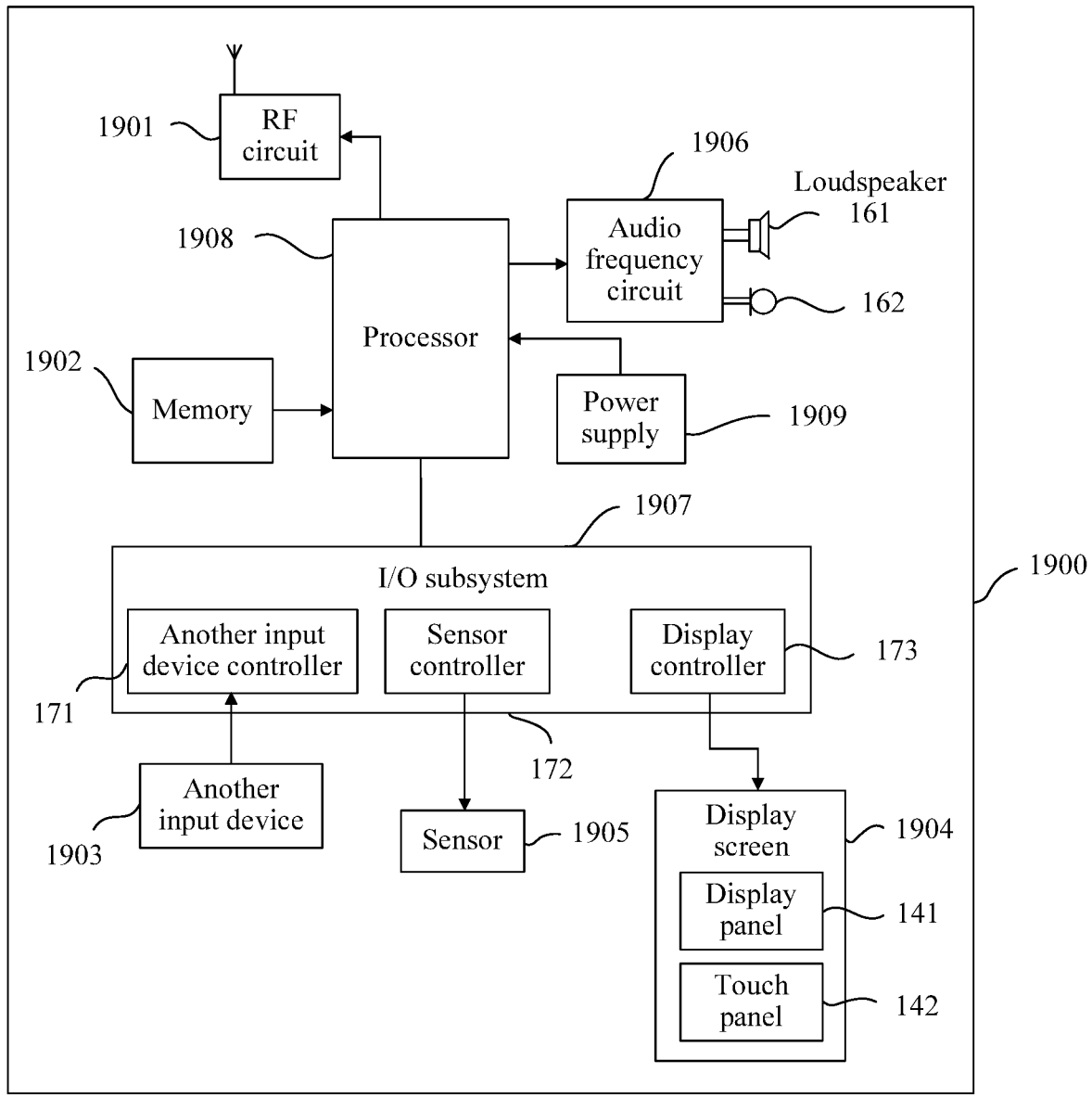
FIG. 19 is a schematic structural diagram of a user terminal according to an embodiment of the present invention.

A fourth embodiment of the present invention provides a user terminal. For example, the user terminal is a mobile phone. FIG. 19 is a block diagram of a part of a structure of a mobile phone 1900 according to an embodiment of the present invention. Referring to FIG. 19, the mobile phone 1900 includes components such as an RF (Radio Frequency, radio frequency) circuit 1901, a memory 1902, another input device 1903, a display screen 1904, a sensor 1905, an audio frequency circuit 1906, an I/O subsystem 1907, a processor 1908, and a power supply 1909. A person skilled in the art can understand that the structure of the mobile phone shown in FIG. 19 constitutes no limitation on the mobile phone. The mobile phone may include components more or less than those shown in the figure, or may combine some components, or split some components, or have different component arrangements.

The following describes each component of the mobile phone 1900 in detail with reference to FIG. 19.

The RF circuit 1901 may be configured to: receive and send a signal in an information receiving or sending process or a call process, and in particular, receive downlink information of a base station, and then send the downlink information to the processor 1908 for processing; and in addition, send designed uplink data to the base station. Generally, the RF circuit includes but is not limited to an antenna, at least one amplifier, a transceiver, a coupler, an LNA (Low Noise Amplifier, low noise amplifier), or a duplexer. In addition, the RF circuit 1901 may communicate with a network and another device by means of wireless communication. Any communications standard or protocol that includes but is not limited to GSM (Global System of Mobile communication, Global System for Mobile Communications), GPRS (General Packet Radio Service, general packet radio service), CDMA (Code Division Multiple Access, Code Division Multiple Access), WCDMA (Wideband Code Division Multiple Access, Wideband Code Division Multiple Access), LTE (Long Term Evolution, Long Term Evolution), email, or SMS (Short Messaging Service, short message service) may be used for the wireless communication.

The memory 1902 may be configured to store a software program and a module. The processor 1908 executes various functional applications of the mobile phone 1900 and performs data processing by running the software program and the module stored in the memory 1902. The memory 1902 may mainly include a program storage area and a data storage area. The program storage area may store an operating system, an application program required by at least one function (such as an audio play function or an image play function), and the like. The data storage area may store data (such as audio data or a phonebook) created based on use of the mobile phone 1900, and the like. In addition, the memory 1902 may include a high-speed random access memory, or may include a nonvolatile memory, such as at least one magnetic disk storage device, a flash memory device, or another volatile solid-state storage device.

The another input device 1903 may be configured to: receive entered digital or character information; and generate key signal input related to user setting and function control of the mobile phone 1900. Specifically, the another input device 1903 may include but is not limited to one or more of a physical keyboard, a function button (such as a volume control button or a power on/off button), a trackball, a mouse, a joystick, or an optical mouse (the optical mouse is a touch-sensitive surface that does not display visual output, or an extension of a touch-sensitive surface formed by a touchscreen). The another input device 1903 is connected to another input device controller 171 in the I/O subsystem 1907, and exchanges a signal with the processor 1908 under the control of the another input device controller 171.

The display screen 1904 may be configured to display information entered by a user or information provided to a user, and various menus of the mobile phone 1900, and may also receive user input. For example, the display screen 1904 may display information that needs to be displayed in the foregoing method embodiment, for example, an unread dedicated message, a selection list including a message option, a selection list including options of a plurality of time periods, an upward jump arrow, or a downward jump arrow. Specifically, the display screen 1904 may include a display panel 141 and a touch panel 142. The display panel 141 may be configured in a form of an LCD (Liquid Crystal Display, liquid crystal display) or an OLED (Organic Light-Emitting Diode, organic light-emitting diode). The touch panel 142, also referred to as a touchscreen, a touch-sensitive screen, or the like, may collect a contact or contactless operation performed by the user on or near the touch panel 142 (for example, an operation performed by the user on or near the touch panel 142 by using any proper object or accessory such as a finger or a stylus, or a motion sensing operation. An operation type of the operation is a single-point control operation, a multipoint control operation, or the like), and may drive a corresponding connection apparatus based on a preset program. Optionally, the touch panel 142 may include two parts: a touch detection apparatus and a touch controller. The touch detection apparatus detects a touch orientation and a touch gesture of the user, detects a signal brought by a touch operation, and sends the signal to the touch controller. The touch controller receives touch information from the touch detection apparatus, converts the touch information into information that can be processed by the processor, and then sends the information to the processor 1908, and can receive and execute a command sent by the processor 1908. In addition, the touch panel 142 may be implemented by using a plurality of types such as a resistive type, a capacitive type, infrared, and a surface acoustic wave. Further, the touch panel 142 may cover the display panel 141. The user may perform, based on content displayed on the display panel 141 (the displayed content includes but is not limited to a soft keyboard, a virtual mouse, a virtual key, and an icon), an operation on or near the touch panel 142 covered by the display panel 141. After detecting a touch operation performed on or near the touch panel 142, the touch panel 142 transfers the touch operation to the processor 1908 by using the I/O subsystem 1907, so as to determine a touch event type to determine user input. Then the processor 1908 provides corresponding visual output on the display panel 141 based on the touch event type and the user input by using the I/O subsystem 1907. Although the touch panel 142 and the display panel 141 in FIG. 19 are used as two independent parts to implement input and input functions of the mobile phone 1900, in some embodiments, the touch panel 142 and the display panel 141 may be integrated to implement the input and output functions of the mobile phone 1900.

The mobile phone 1900 may further include at least one sensor 1905 such as a fingerprint sensor, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 1900 moves to an ear. As a motion sensor, an accelerometer sensor may detect an acceleration value in each direction (generally three axes), may detect a value and a direction of gravity when the mobile phone 1900 is static, and may be applied to an application for recognizing a mobile phone posture (for example, switching between landscape and portrait screens, a relevant game, and magnetometer posture calibration), a function related to vibration recognition (such as a pedometer or a knock), and the like. For other sensors such as a gyroscope, a barometer, a hygrometer, a thermometer, and an infrared sensor that may also be disposed on the mobile phone 1900, details are not described herein.

The audio frequency circuit 1906, a loudspeaker 161, and a microphone 162 may provide audio interfaces between the user and the mobile phone 1900. The audio frequency circuit 1906 may transmit, to the loudspeaker 161, a signal converted from received audio data, and the loudspeaker 161 converts the signal into a sound signal for output. In addition, the microphone 162 converts a collected sound signal into a signal, and the audio frequency circuit 1906 receives the sound signal, converts the sound signal into audio data, and then outputs the audio data to the RF circuit 1901, so that the RF circuit 1901 can send the audio data to, for example, another mobile phone, or output the audio data to the memory 1902 for further processing.

The I/O subsystem 1907 is configured to control an external input/output device, and may include the another input device controller 171, a sensor controller 172, and a display controller 173. Optionally, one or more other input device controllers 171 receive a signal from the another input device 1903 and/or send a signal to the another input device 1903. The another input device 1903 may include a physical button (a press button, a rocker button, or the like), a dial pad, a slider switch, a joystick, a click scroll wheel, and an optical mouse (the optical mouse is a touch-sensitive surface that does not display visual output, or an extension of a touch-sensitive surface formed by a touchscreen). It should be noted that the another input device controller 171 may be connected to any one or more of the foregoing devices. The display controller 173 in the I/O subsystem 1907 receives a signal from the display screen 1904 and/or sends a signal to the display screen 1904. After the display screen 1904 detects the user input, the display controller 173 converts the detected user input into interaction with a user interface object displayed on the display screen 1904, that is, implements human-machine interaction. The sensor controller 172 may receive a signal from one or more sensors 1905 and/or send a signal to one or more sensors 1905.

The processor 1908 is a control center of the mobile phone 1900, uses various interfaces and lines to connect to all parts of the entire mobile phone, and performs various functions of the mobile phone 1900 and processes data by running or executing the software program and/or the module stored in the memory 1902 and invoking data stored in the memory 1902, so as to perform overall monitoring on the mobile phone. For example, the processor 1908 may be configured to execute any process executed by the user terminal in the foregoing method embodiment. Optionally, the processor 1908 may include one or more processing units. Preferably, an application processor and a modem processor may be integrated into the processor 1908. The application processor mainly processes an operating system, a user interface, an application program, and the like. The modem processor mainly processes wireless communication. It may be understood that the modem processor may not be integrated into the processor 1908.

The mobile phone 1900 further includes the power supply 1909 (such as a battery) that supplies power to the parts. Preferably, the power supply may be logically connected to the processor 1908 by using a power supply management system, so that functions such as charging, discharging, and power consumption management are implemented by using the power supply management system.

The mobile phone 1900 may further include a camera, a Bluetooth module, and the like although they are not shown. Details are not described herein.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, and the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. A message display method, comprising:
    detecting a first press parameter when a first user performs a press operation on a user terminal, wherein the user terminal comprises a communication application, wherein the communication application comprises messages of a group, wherein the group comprises a plurality of users including the first user, and wherein the messages comprise unread dedicated messages dedicated to the first user; and
    displaying only the unread dedicated messages of the first user on the user terminal when the first press parameter is greater than a first preset parameter.

2. The message display method of claim 1, wherein detecting the first press parameter comprises detecting the first press parameter when the first user performs the press operation on a screen of the user terminal.

3. The message display method of claim 1, wherein detecting the first press parameter comprises detecting the first press parameter when the first user performs the press operation on an application icon of the communication application.

4. The message display method of claim 1, wherein detecting the first press parameter comprises detecting the first press parameter when the first user performs the press operation on a screen of the communication application.

5. The message display method of claim 1, wherein detecting the first press parameter comprises detecting the first press parameter when the first user performs the press operation on a group option on a screen of the communication application.

6. The message display method of claim 1, wherein detecting the first press parameter comprises detecting the first press parameter when the first user performs the press operation on a message display screen corresponding to the group of the communication application.

7. The message display method of claim 1, further comprising:
    selecting one of the unread dedicated messages; and
    jumping to a location of the one of the unread dedicated messages on a message display screen of the user terminal.

8. The message display method of claim 7, further comprising sorting the unread dedicated messages based on a sequence of posting times of the unread dedicated messages to obtain a sorting result, wherein jumping to the location of the one of the unread dedicated messages on the message display screen of the user terminal comprises jumping to a location of a first unread dedicated message on the message display screen with an earliest or latest posting time.

9. The message display method of claim 8, further comprising:
   detecting a second press parameter when the first user performs the press operation on the message display screen; and
   jumping to a location of a next unread dedicated message on the message display screen when the second press parameter is greater than a second preset parameter.

10. The message display method of claim 8, further comprising:
    displaying a jump arrow on the message display screen, wherein the jump arrow comprises at least one of an upward jump arrow or a downward jump arrow;
    jumping to a location of a previous unread dedicated message on the message display screen when a press operation on the upward jump arrow is detected; and
    jumping to a location of a next unread dedicated message on the message display screen when a press operation on the downward jump arrow is detected.

11. The message display method of claim 7, further comprising:
    displaying a first selection list, wherein the first selection list comprises a plurality of message options, and wherein the message options are in a one-to-one correspondence with the unread dedicated messages; and
    receiving a first selection instruction of the first user for the message options,
    wherein jumping to the location of the one of the unread dedicated messages on the message display screen of the user terminal comprises jumping to a location of a second unread dedicated message on the message display screen, and
    wherein the second unread dedicated message corresponds to a message option selected using the first selection instruction.

12. The message display method of claim 11, wherein the message options in the first selection list are sorted and displayed based on:
    a sequence of posting times of the unread dedicated messages corresponding to the message options;
    priorities of senders of the unread dedicated messages corresponding to the message options; or
    priorities of keywords in the unread dedicated messages corresponding to the message options.

13. The message display method of claim 7, further comprising:
    grouping the unread dedicated messages into corresponding time periods based on posting times of the unread dedicated messages to classify all the unread dedicated messages;
    displaying a second selection list, wherein the second selection list comprises time period options corresponding to the unread dedicated messages; and
    receiving a second selection instruction of the first user for the time period options,
    wherein jumping to the location of the one of unread dedicated messages on the message display screen of the user terminal comprises jumping to a location of a third unread dedicated message on the message display screen of the group, and
    wherein the third unread dedicated message is an unread dedicated message comprised in a time period selected using the second selection instruction.

14. The message display method of claim 1, wherein the first press parameter comprises press force, and wherein the first preset parameter comprises preset force.

15. The message display method of claim 1, wherein the first press parameter comprises press duration, and wherein the first preset parameter comprises preset duration.

16. A user terminal, comprising:
    one or more processors; and
    a memory storing one or more programs, wherein when executed by the one or more processors, the one or more programs cause the user terminal to:
      detect a first press parameter when a first user performs a press operation on the user terminal, wherein the user terminal comprises a communication application, and wherein the communication application comprises messages of a group, wherein the group comprises a plurality of users including the first user, and wherein the messages comprise unread dedicated messages dedicated to the first user; and
      display only the unread dedicated messages of the first user on the user terminal when the first press parameter is greater than a first preset parameter.

17. The user terminal of claim 16, wherein the user terminal is caused to detect the first press parameter by detecting the first press parameter when the first user performs the press operation on a screen of the user terminal.

18. The user terminal of claim 16, wherein the user terminal is caused to detect the first press parameter by detecting the first press parameter when the first user performs the press operation on an application icon of the communication application.

19. The user terminal of claim 16, wherein the user terminal is caused to detect the first press parameter by detecting the first press parameter when the first user performs the press operation on a screen of the communication application.

20. The user terminal of claim 16, wherein the user terminal is caused to detect the first press parameter by detecting the first press parameter when the first user performs the press operation on a group option on a screen of the communication application.

* * * * *

UNITED STATES PATENT AND TRADEMARK OFFICE
CERTIFICATE OF CORRECTION

PATENT NO. : 10,757,245 B2
APPLICATION NO. : 16/321146
DATED : August 25, 2020
INVENTOR(S) : Xiaobo Yu, Yajun Zhang and Shuiping Long Page 1 of 1

It is certified that error appears in the above-identified patent and that said Letters Patent is hereby corrected as shown below:

On the Title Page

(57) Abstract, Line 2: "method includes: detecting, by a" should read "method includes detecting, by a"

(57) Abstract, Line 7: "group of a communicate" should read "group of a communication"

Signed and Sealed this
Thirteenth Day of October, 2020

Andrei Iancu
*Director of the United States Patent and Trademark Office*